(12) United States Patent
Gao et al.

(10) Patent No.: US 11,489,645 B2
(45) Date of Patent: Nov. 1, 2022

(54) SYSTEM INFORMATION REDUNDANCY VERSION DETERMINING METHOD AND APPARATUS

(71) Applicant: Huawei Technologies Co., Ltd., Shenzhen (CN)

(72) Inventors: Kuandong Gao, Chengdu (CN); Huang Huang, Chengdu (CN); Mao Yan, Chengdu (CN); Hua Shao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 17/036,214

(22) Filed: Sep. 29, 2020

(65) Prior Publication Data
US 2021/0014025 A1 Jan. 14, 2021

Related U.S. Application Data

(63) Continuation of application No. PCT/CN2019/079493, filed on Mar. 25, 2019.

(30) Foreign Application Priority Data

Apr. 4, 2018 (CN) .......................... 201810299694.1

(51) Int. Cl.
*H04L 5/00* (2006.01)
*H04W 48/12* (2009.01)
(Continued)

(52) U.S. Cl.
CPC ........... *H04L 5/0053* (2013.01); *H04W 48/12* (2013.01); *H04W 56/001* (2013.01); *H04W 72/042* (2013.01); *H04W 72/0446* (2013.01)

(58) Field of Classification Search
CPC .. H04L 5/0053; H04W 48/12; H04W 56/001; H04W 72/042; H04W 72/0446; H04W 48/16
See application file for complete search history.

(56) References Cited

U.S. PATENT DOCUMENTS

| | | | |
|---|---|---|---|
| 9,414,339 B2* | 8/2016 | Kim | ..................... H04J 11/0069 |
| 2016/0006548 A1 | 1/2016 | Yang et al. | |

(Continued)

FOREIGN PATENT DOCUMENTS

| | | |
|---|---|---|
| CN | 101547075 A | 9/2009 |
| CN | 101883387 A | 11/2010 |

(Continued)

OTHER PUBLICATIONS

Samsung, "Summary on A.I. 7.1.2.3: Remaining details on other system information delivery", 3GPP TSG RAN WG1 Meeting AH 1801, R1-1801142, Vancouver, Canada, Jan. 22-26, 2018, 6 pages.

(Continued)

*Primary Examiner* — Diane L Lo
*Assistant Examiner* — Abusayeed M Haque
(74) *Attorney, Agent, or Firm* — Slater Matsil, LLP

(57) ABSTRACT

This application provides a system information redundancy version determining method and apparatus. A communications device determines at least one time-domain resource unit Ux, and determines a redundancy version RVx for system information on the time-domain resource unit Ux according to the time-domain resource unit Ux, where x is an identifier of the time-domain resource unit, the redundancy version RVx satisfies RVx=(Int1(X1/X2*(Int2(x/M) mod K))) mod L, x is a non-negative integer, X1 and X2 are non-zero real numbers, M is a positive real number, K and L are positive integers, mod indicates a modulo operation, (Continued)

---

A communications device determines at least one time-domain resource unit Ux, where x is an identifier of the time-domain resource unit — 401

The communications device determines a redundancy version RVx for system information on the time-domain resource unit Ux based on the time-domain resource unit Ux, where the redundancy version RVx satisfies RVx=(Int1(X1/X2*(Int2(x/M) mod K))) mod L — 402

Int1 indicates rounding up or rounding down, and Intl indicates rounding up or rounding down.

18 Claims, 20 Drawing Sheets

(51) Int. Cl.
  *H04W 72/04* (2009.01)
  *H04W 56/00* (2009.01)

(56) References Cited

U.S. PATENT DOCUMENTS

| | | | | |
|---|---|---|---|---|
| 2019/0140776 A1* | 5/2019 | Seo | ...................... | H04B 7/0456 |
| 2019/0297560 A1* | 9/2019 | Gao | .................... | H04W 72/044 |
| 2020/0229152 A1* | 7/2020 | Park | .................... | H04W 72/042 |

FOREIGN PATENT DOCUMENTS

| | | | | |
|---|---|---|---|---|
| CN | 102118240 A | | 7/2011 | |
| CN | 104904175 | * | 9/2013 | ............. H04L 29/06 |
| CN | 107182130 A | | 9/2017 | |
| CN | 107278383 A | | 10/2017 | |
| CN | 107528682 A | | 12/2017 | |
| CN | 110035506 | * | 1/2018 | ........... H04L 5/0048 |
| CN | 107733573 A | | 2/2018 | |
| CN | 107736060 A | | 2/2018 | |
| EA | 027151 B1 | | 6/2017 | |
| RU | 2577318 C2 | | 3/2016 | |
| WO | 2014185748 A1 | | 11/2014 | |

OTHER PUBLICATIONS

Samsung, "Remaining minimum system information delivery", 3GPP TSG RAN WG1 Meeting #90, R1-1713556, Prague, Czechia, Aug. 21-25, 2017, 5 pages.

3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC); Protocol specification (Release 15), 776 pages.

3GPP TS 38.214 V1.1.0 (Oct. 2017), 3rd Generation Partnership Project; Technical Specification Group Radio Access Network; NR; Physical layer procedures for data (Release 15), 36 pages.

Nokia et al., "On issues related to DL signals and channels", 3GPP TSG-RAN WG1 meeting #94, R1-1809370, Gothenburg, Sweden, Aug. 20-24, 2018, 16 pages.

Huawei et al., "Discussion on SS block composition and SS burst set composition", 3GPP TSG RAN WG1 Meeting #89, R1-1708161, Hangzhou, China, May 15-29, 2017, 6 pages.

3rd Generation Partnership Project Technical Specification Group Radio Access Network; NR; Physical layer procedures for control (Release 15), 3GPP TS 38.213 V15.0.0 (Dec. 2017) 56 pages.

Huawei et al., "Discussion on SS burst set composition and SS block time index indication", 3GPP TSG RAN WG1 Meeting #88bis, R1-1705052, Spokane, WA, USA, Apr. 3-7, 2017, 9 pages.

3rd Generation Partnership Project;Technical Specification Group Radio Access Network; NR; Physical layer procedures for data (Release 15), 3GPP TS 38.214 V15.0.0 (Dec. 2017), 71 pages.

3rd Generation Partnership Project Technical Specification Group Radio Access Network; NR; Physical channels and modulation (Release 15), 3GPP TS 38.211 V15.1.0 (Mar. 2018), 90 pages.

3rd Generation Partnership Project; Technical Specification Group Radio Access Network; NR; Radio Resource Control (RRC) protocol specification (Release 15), 3GPP TS 38.331 V15.1.0 (Mar. 2018), 268 pages.

CATT, "Summary of Offline Discussion on Remaining Minimum System Information", 3GPP TSG RAN WG1 #91, R1-1721473 (Revision of R1-1720169), Reno, NV, US, Nov. 27-Dec. 1, 2017, 29 pages.

Nokia et al., "On Other System Information delivery", 3GPP TSG-RAN WG1 NR AH #18-01, R1-1800805, Vancouver, Canada, Jan. 22-26, 2018, 5 pages.

Huawei et al., "Remaining details on the common search space configuration for OSI", 3GPP TSG RAN WG1 Ad Hoc Meeting, R1-1800031, Vancouver, Canada, Jan. 22-26, 2018, 2 pages.

* cited by examiner

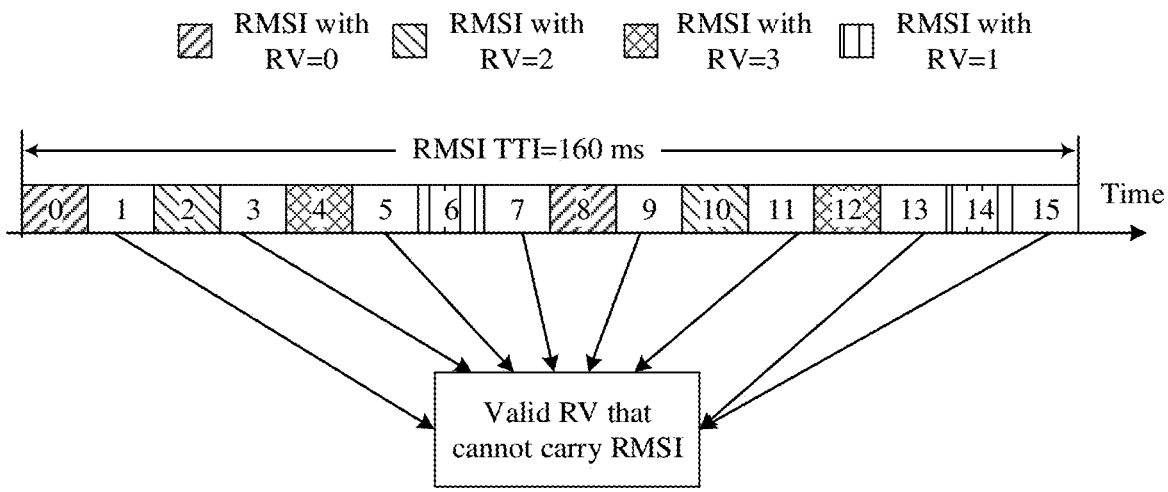

FIG. 3C

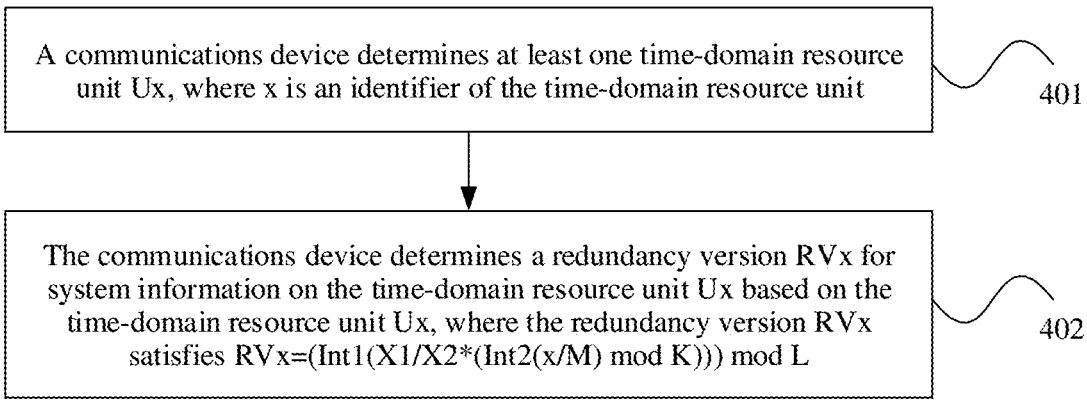

401 A communications device determines at least one time-domain resource unit Ux, where x is an identifier of the time-domain resource unit 402 The communications device determines a redundancy version RVx for system information on the time-domain resource unit Ux based on the time-domain resource unit Ux, where the redundancy version RVx satisfies RVx=(Int1(X1/X2*(Int2(x/M) mod K))) mod L

FIG. 4

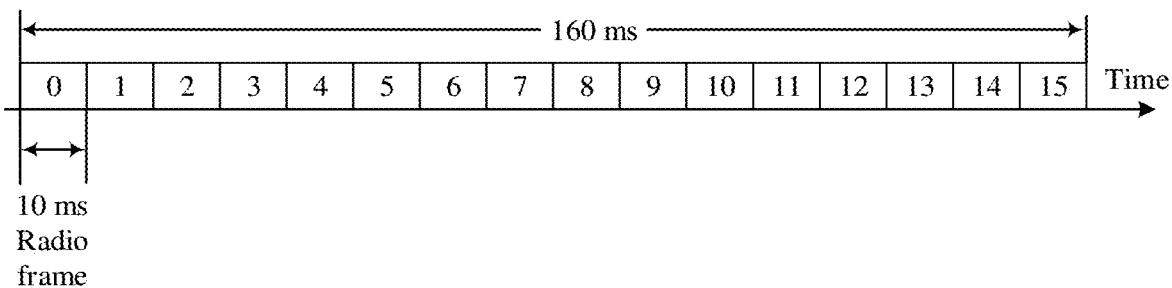

FIG. 5A $RVx=(ceil(3/2*(floor(x/2) \bmod 4))) \bmod 4$, or
$RVx=(ceil(3/2*(ceil(x/4) \bmod 4))) \bmod 4$
$x=\{0, 1, ..., 15\}$

SYSTEM INFORMATION REDUNDANCY VERSION DETERMINING METHOD AND APPARATUS

CROSS-REFERENCE TO RELATED APPLICATIONS

This application is a continuation of International Application No. PCT/CN2019/079493, filed on Mar. 25, 2019, which claims priority to Chinese Patent Application No. 201810299694.1, filed on Apr. 4, 2018. The disclosures of the aforementioned applications are hereby incorporated by reference in their entireties.

TECHNICAL FIELD

This application relates to the field of communication technologies, and in particular, to a system information redundancy version determining method and apparatus.

BACKGROUND

In a wireless communications network, system information is system-level or cell-level information delivered by a network device to a terminal device. For example, in LTE (long term evolution), system information may be a system information block (SIB), and different SIBs (a SIB 1, a SIB 2, and the like) are defined, and the different SIBs carry information having different functions.

A transmission time interval (TTI) of the SIB 1 in LTE is 80 milliseconds (ms). That the TTI is 80 ms means that SIBs 1 sent in 80 ms carry same information, and a SIB 1 carrying different information is sent only in next 80 ms. A SIB 1 transmission periodicity is 20 ms. Therefore, the SIB 1 is repeatedly sent four times in the TTI of 80 ms, that is, the SIB 1 is transmitted in a radio frame (also referred to as a system frame) whose SFN (System Frame Number) is an even number, where the SFN indicates a frame number of the radio frame. Different redundancy versions (RV) are used for the four times of SIB 1 transmission. Specifically, the RVs used for the four times of SIB 1 transmission are respectively 0, 2, 3, and 1. FIG. 1A shows an example of the foregoing SIB 1 transmission. In a SIB 1 TTI periodicity of 80 ms, a SIB 1 whose RV is 0 is transmitted in the first radio frame (namely, a radio frame corresponding to SFN=0) in the first transmission periodicity of 20 ms, a SIB 1 whose RV is 2 is transmitted in the first radio frame (namely, a radio frame corresponding to SFN=2) in the second 20 ms, a SIB 1 whose RV is 3 is transmitted in the first radio frame (namely, a radio frame corresponding to SFN=4) in the third 20 ms, and a SIB 1 whose RV is 1 is transmitted in the first radio frame (namely, a radio frame corresponding to SFN=6) in the fourth 20 ms. In addition, the four SIBs 1 carry same information.

For a SIB 2 in LTE, a transmission periodicity of the SIB 2 is 160 ms, and the SIB 2 is transmitted according to a window. The window is a configured time period, the SIB 2 can be transmitted only in the window, and the SIB 2 is transmitted at least once in the window. FIG. 1B shows an example of SIB 2 transmission in LTE, and in the example, a length of a radio frame is 10 ms. FIG. 1B shows two SIB 2 windows. Each window includes two radio frames. One window includes a radio frame 0 and a radio frame 1, and the other window includes a radio frame 16 and a radio frame 17. A time interval between the two windows is a SIB 2 transmission periodicity (namely, 160 ms). Each of the windows includes 20 subframes each having a length of 1 ms. An RV of a SIB 2 that can be carried in the 20 subframes is determined by an identifier of a subframe in which the SIB 2 is located. Specifically, in the window including the radio frame 16 and the radio frame 17, five subframes whose identifiers are {i=0, i=4, i=8, i=12, i=16} may carry a SIB 2 whose RV is 0, five subframes whose identifiers are {i=1, i=5, i=9, i=13, i=17} may carry a SIB 2 whose RV is 2, five subframes whose identifiers are {i=2, i=6, i=10, i=14, i=18} may carry a SIB 2 whose RV is 3, and five subframes whose identifiers are {i=3, i=7, i=11, i=15, i=19} may carry a SIB 2 whose RV is 1.

For another example, in a new radio (NR) network, a beamforming technology is used to limit energy of a transmitted signal in a direction, to increase receiving efficiency of the signal in the direction. To increase coverage, beamforming needs to be combined with beam sweeping to cover different directions as fully as possible. In addition, transmission and reception of a redundancy version for system information needs to be supported.

SUMMARY

One aspect of embodiments of this application provides a wireless communication method and apparatus. A communications device determines at least one time-domain resource unit Ux, where x is an identifier of the time-domain resource unit. The communications device determines a redundancy version RVx for system information on the time-domain resource unit Ux according to the time-domain resource unit Ux, where the redundancy version RVx satisfies $RVx = (Int1(X1/X2*(Int2(x/M) \bmod K))) \bmod L$, x is a non-negative integer, X1 and X2 are non-zero real numbers, M is a positive real number, K and L are positive integers, mod indicates a modulo operation, Int1 indicates rounding up or rounding down, and Int1 indicates rounding up or rounding down. In this solution, the communications device may be a terminal side device (for example, a terminal device, or a chip that can be used for a terminal device), or a network side device (for example, a base station, or a chip that can be used for a base station). In this solution, a quantity of time-domain resource units that carry a valid RV for the system information is increased, so that a case in which the valid RV for the system information cannot be supported on some time-domain resource units can be avoided, thereby increasing coverage of the system information.

In a possible implementation, M is a predefined positive real number. Preferably, M is one of {1, 2, 4, 5, 8, 16}.

In a possible implementation, M is a quantity of time-domain resource units included in a system information subwindow.

In a possible implementation, the communications device determines M according to a system information transmission periodicity.

In a possible implementation, different system information transmission periodicities correspond to a same value of M.

In a possible implementation, M or the system information transmission periodicity is indicated by an existing field in downlink control information (DCI); or M or the system information transmission periodicity is configured by using higher layer signaling, and the higher layer signaling is at least one of radio resource control (RRC) signaling, system information, or a media access control-control element (MAC-CE); or M or the system information transmission periodicity is configured (indicated) by using DCI and higher layer signaling, and the higher layer signaling is at least one of RRC signaling, system information, or a MAC-CE.

In a possible implementation, M or the system information transmission periodicity in different multiplexing manners of the system information and a synchronization signal block is separately defined or configured (indicated). The different multiplexing manners of the system information and the synchronization signal block include time division multiplexing and frequency division multiplexing.

In the foregoing solution, the quantity of time-domain resource units that can carry the valid RV for the system information is increased, to resolve a problem that a quantity of beams that carry the system information is reduced because beams on some time-domain resource units cannot support the valid RV for the system information, thereby increasing coverage of the system information. In addition, an RV for sending and receiving the system information on one beam can be added in a system information window or a system information subwindow, thereby providing a larger frequency selective gain for receiving the system information.

In a possible implementation, the communications device determines M according to at least one of {a quantity N of synchronization signal blocks, a quantity D of time-domain resource units included in a system information subwindow}.

In a possible implementation, $M=N*D$, $M=n*N*D$, $M=N*D+F$, or $M=n*N*D+F$, where D represents a quantity of time-domain resource units included in one system information subwindow; n represents a positive integer, and may be understood as a multiple of a beam sweeping periodicity in some implementations; and F represents a non-negative integer, and may be obtained through configuration or predefinition in some implementations.

In a possible implementation, a beam that carries the system information in one system information subwindow is one of beams that carry the N synchronization signal blocks.

In the foregoing solution, the quantity of time-domain resource units that can carry the valid RV for the system information is increased, to resolve a problem that a quantity of beams that carry the system information is reduced because beams on some time-domain resource units cannot support the valid RV for the system information, thereby increasing coverage of the system information. In addition, an RV for sending and receiving the system information on one beam can be added in a system information window or a system information subwindow, thereby providing a larger frequency selective gain for receiving the system information.

In a possible implementation, the communications device determines the time-domain resource unit Ux according to the quantity N of synchronization signal blocks. In another possible implementation, the time-domain resource unit Ux is fixed or predefined, or the time-domain resource unit Ux is configured or indicated by the communications device.

In a possible implementation, the time-domain resource unit Ux includes at least one time-domain resource unit that is of a PDCCH and/or a PDSCH and that is used to receive or send the system information. For example, the time-domain resource unit Ux includes a start time-domain resource unit that is of the PDCCH and/or the PDSCH and that is used to receive or send the system information.

In this solution, the system information may include RMSI, or OSI, or RMSI and OSI. The time-domain resource unit may be one of a symbol, a mini-slot, a slot, a subframe, a radio frame, or a sampling point.

In the foregoing solution, the at least one time-domain resource unit in one round of sweeping during beam sweeping of the system information is determined, so that a quantity of times that a terminal device blindly detects the system information can be reduced, thereby reducing power consumption and complexity of the terminal device.

According to a second aspect, an embodiment of this application provides a wireless communication method and apparatus. A communications device determines at least two time-domain resource units that are consecutive in time domain and that can be used to receive or send system information, and determines redundancy versions for the system information on the at least two time-domain resource units, where the redundancy versions for the system information on the at least two time-domain resource units are the same. The communications device receives or sends the system information on the at least two time-domain resource units by using the same redundancy version.

In a possible implementation, the at least two time-domain resource units are time-domain resource units that can carry the system information.

In a possible implementation, the at least two time-domain resource units belong to one time-domain resource unit set. The time-domain resource unit set includes one or more radio frames, one or more subframes, one or more slots, one or more mini-slots, one or more symbols, one or more system information windows, one or more system information subwindows, one or more beam sweeping periodicities, or one or more system information occasions, where the system information occasion is a set of time-domain resource units that are discrete or consecutive in time domain, and the system information occasion may carry a PDCCH for the system information and/or a PDSCH for the system information.

In the foregoing solution, the system information includes RMSI, or OSI, or RMSI and OSI. The time-domain resource unit may be one of a symbol, a mini-slot, a slot, a subframe, a radio frame, or a sampling point.

In the foregoing solution, a quantity of time-domain resource units that can carry the valid RV for the system information is increased, to resolve a problem that a quantity of beams that carry the system information is reduced because beams on some time-domain resource units cannot support the valid RV for the system information, thereby increasing coverage of the system information. In addition, in some implementations, an RV for sending and receiving the system information on one beam can be added in a system information window or a system information subwindow, thereby providing a larger frequency selective gain for receiving the system information.

According to a third aspect, an embodiment of this application provides a communications device, including a processing module, where the processing module is configured to determine at least one time-domain resource unit Ux, where x is an identifier of the time-domain resource unit; and the processing module determines a redundancy version RVx for system information on the time-domain resource unit Ux according to the time-domain resource unit Ux, where the redundancy version RVx satisfies $RVx=(Int1(X1/X2*(Int2(x/M) \bmod K))) \bmod L$, x is a non-negative integer, X1 and X2 are non-zero real numbers, M is a positive real number, K and L are positive integers, mod indicates a modulo operation, Int1 indicates rounding up or rounding down, and Int1 indicates rounding up or rounding down.

In a possible implementation, M is a predefined positive real number. Preferably, M is one of {1, 2, 4, 5, 8, 16}.

In a possible implementation, M is a quantity of time-domain resource units included in a system information subwindow.

In a possible implementation, the processing module determines M according to a system information transmission periodicity.

In a possible implementation, different system information transmission periodicities correspond to a same value of M.

In a possible implementation, the communications device further includes a transceiver module, where M or the system information transmission periodicity is indicated by an existing field in downlink control information (DCI); or M or the system information transmission periodicity is configured by using higher layer signaling, and the higher layer signaling is at least one of radio resource control (RRC) signaling, system information, or a media access control-control element (MAC-CE); or M or the system information transmission periodicity is configured (indicated) by using DCI and higher layer signaling, and the higher layer signaling is at least one of RRC signaling, system information, or a MAC-CE; and the DCI and/or the higher layer signaling are/is received or sent by the transceiver module.

In a possible implementation, M or the system information transmission periodicity in different multiplexing manners of the system information and a synchronization signal block is separately defined or configured (indicated). The different multiplexing manners of the system information and the synchronization signal block include time division multiplexing and frequency division multiplexing.

In a possible implementation, the processing module determines M according to at least one of {a quantity N of synchronization signal blocks, a quantity D of time-domain resource units included in a system information subwindow}.

In a possible implementation, M=N*D, M=n*N*D, M=N*D+F, or M=n*N*D+F, where D represents a quantity of time-domain resource units included in one system information subwindow; n represents a positive integer, and may be understood as a multiple of a beam sweeping periodicity in some implementations; and F represents a non-negative integer, and may be obtained through configuration or predefinition in some implementations.

In a possible implementation, a beam that carries the system information in one system information subwindow is one of beams that carry the N synchronization signal blocks.

In the foregoing solution, the quantity of time-domain resource units that can carry the valid RV for the system information is increased, to avoid a problem that a quantity of beams that carry the system information is reduced because beams on some time-domain resource units cannot support the valid RV for the system information, thereby increasing coverage of the system information. In addition, an RV for sending and receiving the system information on one beam can be added in a system information window or a system information subwindow, thereby providing a larger frequency selective gain for receiving the system information.

In a possible implementation, that the processing module is configured to determine a time-domain resource unit Ux includes: the processing module determines the time-domain resource unit Ux according to the quantity N of synchronization signal blocks, where the time-domain resource unit Ux includes at least one time-domain resource unit that is of a PDCCH and/or a PDSCH and that is used to receive or send the system information.

In a possible implementation, the communications device further includes a transceiver module, where that the processing module is configured to determine a time-domain resource unit Ux includes: the time-domain resource unit Ux is fixed or predefined, or the time-domain resource unit Ux is configured or indicated by using signaling received or sent by the transceiver module; and the time-domain resource unit Ux includes at least one time-domain resource unit that is of a PDCCH and/or a PDSCH and that is used to receive or send the system information.

In a possible implementation, that the time-domain resource unit Ux includes at least one time-domain resource unit that is of a PDCCH and/or a PDSCH and that is used to receive or send the system information includes: the time-domain resource unit Ux includes a start time-domain resource unit that is of the PDCCH and/or the PDSCH and that is used to receive or send the system information.

In the foregoing solution, the at least one time-domain resource unit in one round of sweeping during beam sweeping of the system information is determined, so that a quantity of times that a terminal device blindly detects the system information can be reduced, thereby reducing power consumption and complexity of the terminal device.

In a possible implementation, the processing module determines at least two time-domain resource units that are consecutive in time domain and that can be used to receive or send system information, and the processing module determines redundancy versions for the system information on the at least two time-domain resource units, where the redundancy versions for the system information on the at least two time-domain resource units are the same.

In a possible implementation, the at least two time-domain resource units are time-domain resource units that can carry the system information.

In a possible implementation, the at least two time-domain resource units belong to one time-domain resource unit set. The time-domain resource unit set includes one or more radio frames, one or more subframes, one or more slots, one or more mini-slots, one or more symbols, one or more system information windows, one or more system information subwindows, one or more beam sweeping periodicities, or one or more system information occasions, where the system information occasion is a set of time-domain resource units that are discrete or consecutive in time domain, and the system information occasion may carry the PDCCH for the system information and/or the PDSCH for the system information.

In the foregoing solution, a quantity of time-domain resource units that can carry the valid RV for the system information is increased, to resolve a problem that a quantity of beams that carry the system information is reduced because beams on some time-domain resource units cannot support the valid RV for the system information, thereby increasing coverage of the system information. In addition, in some implementations, an RV for sending and receiving the system information on one beam can be added in a system information window or a system information subwindow, thereby providing a larger frequency selective gain for receiving the system information.

In a possible implementation, the system information includes RMSI, or OSI, or RMSI and OSI. The time-domain resource unit may be one of a symbol, a mini-slot, a slot, a subframe, a radio frame, or a sampling point.

According to a fourth aspect, an embodiment of this application provides a communications device, including a processor and a memory, where the memory is configured to store a program, and when the program is executed by the processor, the communications device is enabled to perform the method according to the first aspect or the second aspect.

According to a fifth aspect, an embodiment of this application provides a storage medium, where the storage medium stores a computer program, and when the computer program is executed by a processor, the method according to the first aspect or the second aspect is implemented.

According to a sixth aspect, an embodiment of this application provides a chip system, including a processor, configured to support a communications device in implementing the method according to any one of the foregoing aspects.

According to the system information redundancy version determining method and apparatus provided in the embodiments of this application, the quantity of time-domain resource units that can carry the valid RV for the system information is increased, to avoid a problem that the quantity of beams that carry the system information is reduced because beams on some time-domain resource units cannot support the valid RV for the system information, thereby increasing coverage of the system information.

BRIEF DESCRIPTION OF THE DRAWINGS

FIG. 3C is a schematic diagram of possible RMSI transmission;

FIG. 4 is a schematic flowchart of determining a system information redundancy version according to an embodiment of this application;

FIG. 5A is a schematic diagram of a time-domain resource unit for sending and receiving RMSI;

DETAILED DESCRIPTION OF ILLUSTRATIVE EMBODIMENTS

Figure 2:
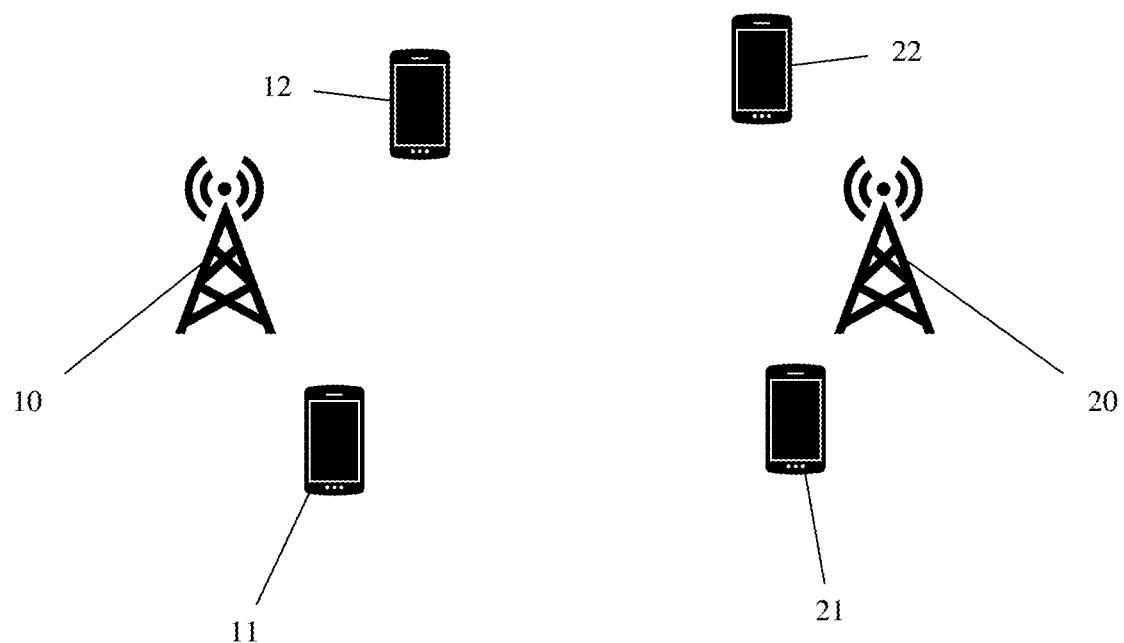
FIG. 2 is a schematic diagram of a communications system to which a system information redundancy version determining method is applied according to an embodiment of this application.

A resource configuration method and apparatus provided in the embodiments of the present application may be applied to a communications system. FIG. 2 is a schematic diagram of an architecture of a communications system. The communications system includes one or more network devices (where for clarity, a network device 10 and a network device 20 are shown in the figure), and one or more terminal devices that communicate with the one or more network devices. In the figure, a terminal device 11 and a terminal device 12 are connected to the network device 10, and a terminal device 21 and a terminal device 22 are connected to the network device 20. A communications device in this application may be a terminal device or a network device.

The technologies described in the embodiments of the present application may be applied to various communications systems, for example, a 2G, 3G, 4G, 4.5G, and 5G communications system, a system in which a plurality of communications systems are integrated, and a future evolved network, such as a code division multiple access (CDMA) system, a wideband code division multiple access (WCDMA) system, a time division multiple access (TDMA)

system, a frequency division multiple access (FDMA) system, an orthogonal frequency-division multiple access (OFDMA) system, a single carrier frequency division multiple access (SC-FDMA) system, a long term evolution (LTE) system, a new radio (NR) system, a wireless fidelity (Wi-Fi) system, a worldwide interoperability for microwave access ( ) system, and a 3rd generation partnership project (3GPP)-related cellular system, and another such communications system.

In this application, the network device may be any device having wireless transmission and reception functions. The network device includes but is not limited to: a base transceiver station (BTS) in a global system for mobile communications (GSM) or CDMA, a NodeB in WCDMA, an evolved NodeB (NodeB or eNB or e-NodeB) in LTE, a base station (gNodeB or gNB) or a transmission reception point (TRP) in NR, a subsequently evolved base station in 3GPP, an access node in a Wi-Fi system, a wireless relay node, a wireless backhaul node, or the like. The base station may be a macro base station, a micro base station, a femto base station, a small cell, a relay station, or the like. A plurality of base stations can support networks using a same technology mentioned above, or may support networks using different technologies mentioned above. The base station may include one or more transmission reception points (TRP) of a co-site or a non-co-site. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description. The plurality of network devices may be base stations of a same type or base stations of different types. The base station may communicate with a terminal device, or may communicate with a terminal device by using a relay station. The terminal device may communicate with a plurality of base stations using different technologies. For example, the terminal device may communicate with a base station supporting an LTE network, may communicate with a base station supporting a 5G network, or may support a dual connection to a base station in an LTE network and a base station in a 5G network.

The terminal device is a device having wireless transmission and reception functions, and may be deployed on land, where the deployment includes indoor or outdoor, handheld, wearable, or vehicle-mounted deployment, may be deployed on water (for example, on a ship), or may be deployed in air (for example, on an aerocraft, a balloon, and a satellite). The terminal device may be a mobile phone, a tablet (Pad), a computer having wireless transmission and reception functions, a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. Sometimes, the terminal device may also be referred to as a terminal, user equipment (UE), an access terminal device, a UE unit, a UE station, a mobile station, a remote station, a remote terminal device, a mobile device, a UE terminal device, a terminal device, a wireless communications device, a UE agent, a UE apparatus, or the like. The terminal may also be fixed or mobile.

For ease of describing the technical solutions in the embodiments of the present application, some terms or concepts in this application are described.

Redundancy version RV: The RV is used to represent one or more code blocks obtained after a transmitted information bit is encoded, where data bits are intercepted from different positions of the code block or a code block sequence as start data bits for re-arrangement, and arranged data is modulated and mapped to a corresponding time-frequency resource; or used to indicate different code blocks mapped to different time-frequency positions, where one code block is obtained after a transmitted information bit is encoded, the code block is divided into the several different code blocks, and the different code blocks may correspond to different RVs. For example, four different RVs are used for four times of data transmission, the four different RVs have four different start positions for intercepting data in a same information bit, and the intercepted data is modulated and mapped to a corresponding frequency domain position. This also means that the same information bit is mapped to different frequency domain positions. When the information bit passes through a channel with relatively high frequency selectiveness, the same information bit may be demodulated from the different frequency domain positions, so that a better frequency selective gain is obtained, and higher demodulation and decoding performance is obtained. It may be understood that another quantity of RVs, for example, six RVs or eight RVs, may be used according to a system requirement. In this application, four RVs are used as an example for description.

A synchronization signal block is defined in a wireless communications system (for example, NR). The synchronization signal block includes at least one of a primary synchronization signal (PSS), a secondary synchronization signal (SSS), a physical broadcast channel (PBCH), and a demodulation reference signal (DMRS). The PSS and the SSS may be used by a terminal device to perform synchronization, the PBCH may be used to carry important system information, and the DMRS may be used to assist in demodulating the PBCH.

In a wireless communications system (for example, NR) that uses beamforming or beam sweeping, the synchronization signal block may be sent and received in a beamforming or beam sweeping manner. To be specific, one beam carries one synchronization signal block, different beams are transmitted on different time-domain resource units, and the time-domain resource unit may be a symbol, a mini-slot, a slot, a subframe, a radio frame, a sampling point, or the like. Synchronization signal blocks are transmitted in a plurality of directions by performing beam sweeping in different directions.

A plurality of time-domain resource units V1 that can be used to transmit the synchronization signal block are configured in the system, the plurality of time-domain resource units V1 are used to carry a possibly transmitted synchronization signal block, the possibly transmitted synchronization signal block has an index or a number thereof, and the index or the number is used to identify the possibly transmitted synchronization signal block.

The foregoing possibly transmitted synchronization signal block may be understood as a candidate of an actually transmitted synchronization signal block. When a synchronization signal block is actually transmitted, one or more of the foregoing possibly transmitted synchronization signal blocks may be transmitted. In other words, the actually transmitted synchronization signal block is one or more of the possibly transmitted synchronization signal blocks. Correspondingly, the one or more time-domain resource units that carry the actually transmitted synchronization signal block are one or more of the plurality of time-domain resource units V1. The actually transmitted synchronization signal block has an index or a number thereof, and the index or the number is used to identify the actually transmitted synchronization signal block.

In a wireless communications system (for example, NR) that uses beamforming or beam sweeping, system information may also be sent and received in a beamforming or beam sweeping manner. To be specific, one beam carries one piece of system information, different beams are transmitted on different time-domain resource units, and the time-domain resource unit may be a symbol, a mini-slot, a slot, a subframe, a radio frame, a sampling point, or the like. System information is transmitted in a plurality of directions by performing beam sweeping in different directions. The system information is usually sent at a specific periodicity, and the periodicity may be referred to as a system information transmission periodicity.

The system information in the embodiments of the present application may be understood as a channel carrying the system information. The channel carrying the system information may be a physical downlink shared channel (PDSCH), and the PDSCH is used to carry data information of the system information. The channel carrying the system information may alternatively be a physical downlink control channel (PDCCH), the PDCCH is used to carry control information for the system information, and the control information may also be referred to as downlink control information (DCI) for the system information.

The system information in the embodiments of the present application may alternatively be understood as data information and/or control information for the system information carried by a channel. The information may be the data information of the system information, and the data information may be carried by a PDSCH. The information may also be the control information for the system information, the control information may be carried by a PDCCH, and the control information may also be referred to as DCI for the system information.

It may be understood that the data information and/or the control information for the system information may be information before or after processing in any one of physical layer processing processes, and the physical layer processing process includes at least one of segmentation, de-segmentation, channel encoding, channel decoding, rate matching, rate de-matching, scrambling, descrambling, modulation, demodulation, physical resource mapping, and physical resource demapping. A channel encoding process is used as an example. The data information of the system information may be data information of the system information before channel encoding, or may be data information of the system information after channel encoding. The control information for the system information may be control information for the system information before channel encoding, or may be control information for the system information after channel encoding.

In this application, for ease of description, the PDSCH that carries the data information of the system information or the data information of the system information is referred to as a PDSCH for the system information, and the PDCCH that carries the control information for the system information or the control information for the system information is referred to as a PDCCH for the system information. Alternatively, the PDSCH for the system information and/or the PDCCH for the system information are/is collectively referred to as system information. However, the embodiment of the present application does not limit names of the system information.

Figure 1A:
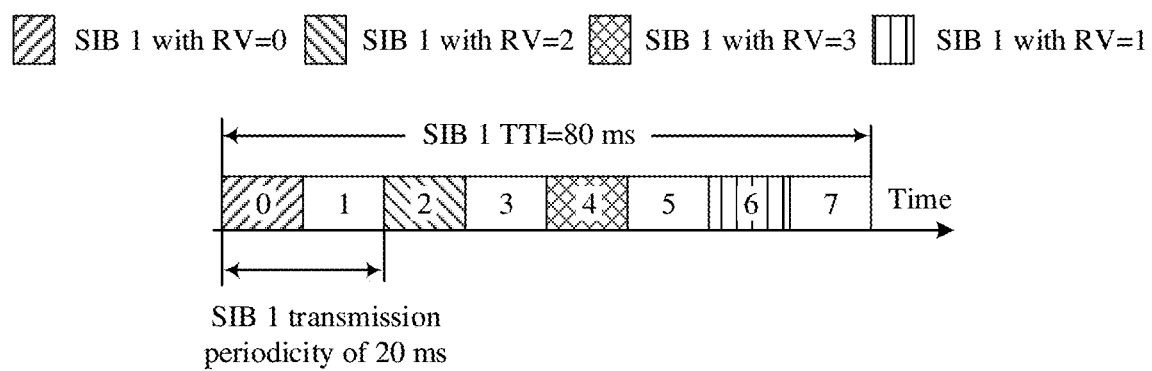
FIG. 1A is a schematic diagram of possible SIB 1 transmission in an LTE system.
Figure 1B:
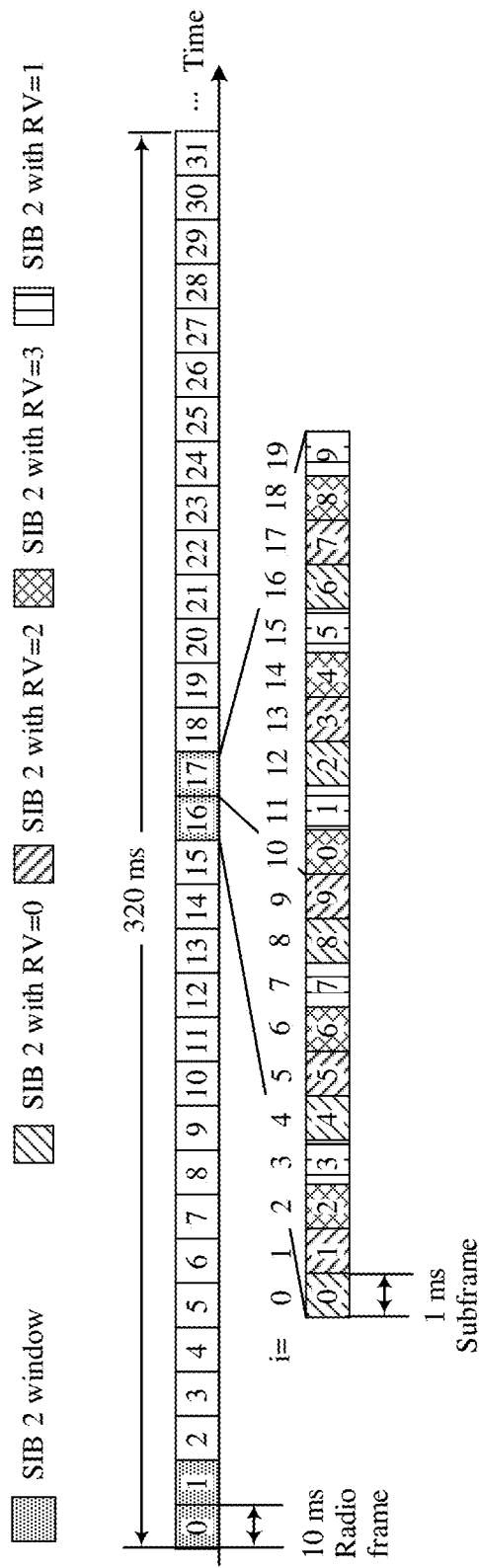
FIG. 1B is a schematic diagram of possible SIB 2 transmission in an LTE system.

Further, transmission of the system information may be similar to window-based transmission shown in FIG. 1B. One window may include one or more subwindows. One subwindow may be understood as a time period in the window, and may include one or more time-domain resource units (for example, a symbol, a mini-slot, a slot, a subframe, a radio frame, or a sampling point). The one or more time-domain resource units may be discrete or consecutive in time domain. One subwindow may be associated with one synchronization signal block, and the synchronization signal block may be a possibly transmitted synchronization signal block or an actually transmitted synchronization signal block. That one subwindow is associated with one synchronization signal block means that a beam that carries system information in the subwindow is consistent with a beam that carries the synchronization signal block associated with the subwindow; or a quasi co-located (QCL) relationship exists between system information carried in the subwindow and the associated synchronization signal block, where the QCL relationship indicates that the two signals may be the same or similar in terms of Doppler spread, a Doppler frequency shift, an average gain, a spatial domain parameter, and the like. One or more pieces of system information may be transmitted in the subwindow, and the system information may be transmitted by using one or more beams. Different subwindows may overlap or may not overlap.

The system information may be a PDCCH for the system information, and the subwindow may be understood as a time domain position of the PDCCH or a time period in which the PDCCH may appear. The terminal device may first search the subwindow for the PDCCH for the system information, and if the terminal device successfully finds the PDCCH for the system information, the terminal device may further receive a PDSCH for the system information according to the PDCCH.

The system information may be the PDSCH for the system information. The terminal device may first search the subwindow for the PDCCH for the system information, and if the terminal device successfully finds the PDCCH for the system information, the terminal device may further receive the PDSCH for the system information according to the PDCCH.

Figure 3A:
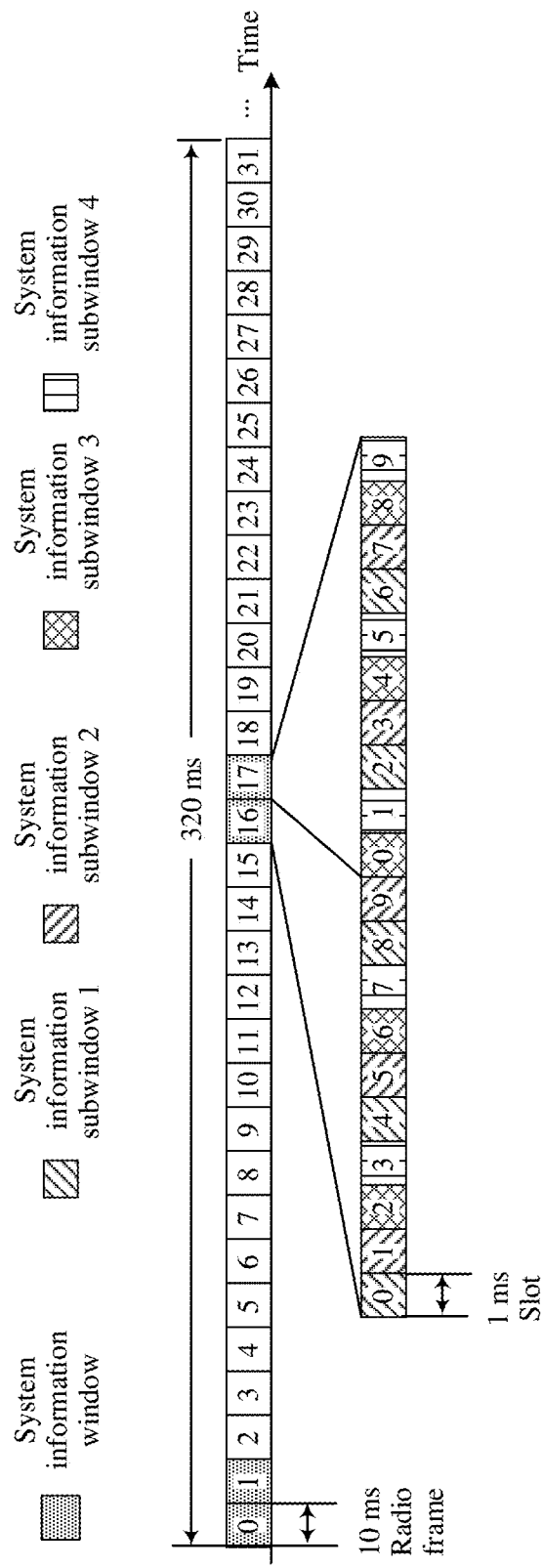
FIG. 3A is a schematic diagram of a system information window and a system information subwindow.

The window may also be referred to as a system information window, a window for system information, a system information sending window, a window for sending system information, a system information receiving window, a window for receiving system information, or the like. The subwindow may also be referred to as a system information subwindow, a subwindow for system information, a system information sending subwindow, a subwindow for sending system information, a system information receiving subwindow, a subwindow for receiving system information, PDCCH occasion(s), a PDCCH subwindow, or the like. The window may have an index or a number thereof, and the index or the number is used to identify the window. The subwindow may have an index or a number thereof, and the index or the number is used to identify the subwindow. FIG. 3A is a possible schematic diagram of a window and a subwindow. FIG. 3A shows two system information windows by using an example in which a radio frame has a length of 10 ms and a slot length of 1 ms, and one radio frame includes 10 slots. Each window includes two radio frames: One window includes a radio frame 0 and a radio frame 1, and the other window includes a radio frame 16 and a radio frame 17. For example, the system information window including the radio frame 16 and the radio frame 17 includes four system information subwindows. Each system information subwindow includes five slots that are discrete in time domain: A system information subwindow 1 includes a slot 0, a slot 4, and a slot 8 in the radio frame 16 and a slot 2 and a slot 6 in the radio frame 17; a system information subwindow 2 includes a slot 1, a slot 5, and a slot 9 in the radio frame 16 and a slot 3 and a slot 7 in the radio frame 17; a system information subwindow 3 includes a slot 2 and a slot 6 in the radio frame 16 and a slot 0, a slot 4, and a slot 8 in the radio frame 17; a system information subwindow 4 includes a slot 3 and a slot 7 in the radio frame 16 and a slot 1, a slot 5, and a slot 9 in the radio frame 17.

Figure 3B:
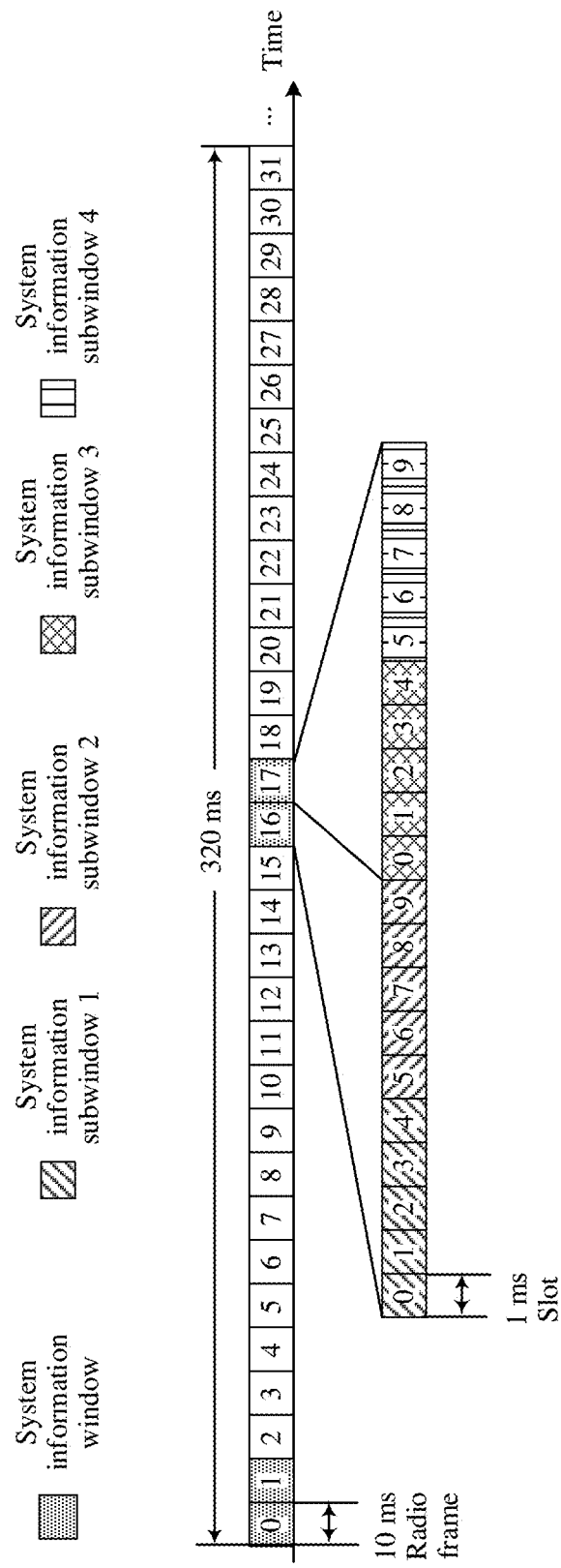
FIG. 3B is another schematic diagram of a system information window and a system information subwindow.

It may be understood that, in the embodiments of the present application, a quantity, distribution, types, and the like of time-domain resource units included in the subwindow are not limited. For example, FIG. 3B is another possible schematic diagram of a window and a subwindow. Compared with FIG. 3A, in FIG. 3B, an example in which a system information subwindow includes time-domain resource units that are consecutive in time domain is used: A system information subwindow 1 includes slots 0 to 4 in the radio frame 16; a system information subwindow 2 includes slots 5 to 9 in the radio frame 16; a system information subwindow 3 includes slots 0 to 4 in the radio frame 17; a system information subwindow 4 includes slots 5 to 9 in the radio frame 17.

As described above, when system information is sent and received in a beamforming or beam sweeping manner, the system information is transmitted in a plurality of directions by performing beam sweeping in different directions. Duration of one round of beam sweeping or a quantity of time-domain resource units during one round of beam sweeping may be referred to as a beam sweeping periodicity. For example, if the system information is sent by using six beams, and one beam uses one slot, the beam sweeping periodicity of the system information is six slots. The system information window includes at least one beam sweeping periodicity, the beam sweeping periodicity may have an index or a number thereof, and the index or the number is used to identify the beam sweeping periodicity in the system information window. Optionally, a length of the system information window may be a multiple of (for example, may be 1 time, 2, 3, 4, 6, 8, 16, 12, 10, 32, 20, 24, 28, 36, 40, 44, 48, 52, 56, 60, 64, or 68 times) the beam sweeping periodicity. Optionally, the system information window may have a same time domain start position as a semi-persistent uplink and downlink resource allocation periodicity. The semi-persistent uplink and downlink resource allocation periodicity may be configured in a semi-persistent manner by the network device for the terminal device by using higher layer signaling. The terminal device may further obtain a downlink time-domain resource unit, a flexible time-domain resource unit, and an uplink time-domain resource unit in the semi-persistent uplink and downlink resource allocation periodicity by using the configuration. The terminal device may obtain, by using the foregoing configuration, a position and duration of the semi-persistent uplink and downlink resource allocation periodicity in time domain, and distribution of the downlink time-domain resource unit, the flexible time-domain resource unit, and the uplink time-domain resource unit in the semi-persistent uplink and downlink resource allocation periodicity in time domain. The downlink time-domain resource unit may be used for downlink transmission. The uplink time-domain resource unit may be used for uplink transmission. The flexible time-domain resource unit may be used for downlink transmission or uplink transmission, and the network device may notify the terminal device of a transmission direction of the flexible time-domain resource unit by using downlink control signaling.

In a wireless communications system (for example, NR) that uses beamforming or beam sweeping, system information may be sent and received in a beamforming or beam sweeping manner. System information carried by one beam is transmitted on a time-domain resource unit, and is sent and received by using a corresponding RV. The time-domain resource unit may be a symbol, a mini-slot, a slot, a subframe, a radio frame, a sampling point, or the like. If the RV corresponding to the time-domain resource unit is still determined by using the method shown in FIG. 1A or FIG. 1B, a beam that can carry the system information may not support a valid RV on some time-domain resource units, and consequently the system information cannot be received or sent on the time-domain resource unit, resulting in a decrease in a quantity of beams carrying the system information, and a decrease in coverage of the system information.

In FIG. 3C, transmission of remaining minimum system information (RMSI) in beam sweeping is used as an example to further describe the foregoing problem. The RMSI is system information defined in an NR system, and may also be referred to as NR-SIB0 information, NR-SIB1 information, or NR-SIB2 information. FIG. 3C shows 16 radio frames (namely, a radio frame whose SFN is 0 to a radio frame whose SFN is 15). For example, duration of each radio frame is 10 ms, and an RMSI TTI is 160 ms. If an RV used to transmit the RMSI in a radio frame is still determined according to the method shown in FIG. 1A (that is, $RV_k=(ceil(3/2*k))$ mod 4, where k=(SFN/2) mod 4), a valid RV can be obtained only in a radio frame whose SFN is an even number (that is, SFN=0, 2, . . . , or 14), but a valid RV cannot be obtained by using the foregoing manner in a radio frame whose SFN is an odd number (that is, SFN=1, 3, . . . , or 15). When the SFN is an odd number, SFN/2 is not an integer. Therefore, a modulo operation cannot be performed on 4. It can be learned that in the 16 radio frames shown in FIG. 3C, beams in only eight radio frames can carry valid RVs of the RMSI, and beams in the other eight radio frames cannot carry the valid RVs of the RMSI. Consequently, a quantity of beams carrying the RMSI is reduced, resulting in a decrease in coverage of the RMSI, and affecting system performance.

According to the system information redundancy version determining method and apparatus provided in the embodiments of the present application, a quantity of time-domain resource units that can carry a valid RV for system information is increased, to resolve a problem that a quantity of beams that carry the system information is reduced because beams on some time-domain resource units cannot support the valid RV for the system information, thereby increasing coverage of the system information.

In the embodiments of the present application, a type of the system information includes at least one of RMSI or other system information (OSI). The RMSI may carry at least one of content such as uplink random access configuration information, OSI scheduling information, synchronization signal periodicity information, and synchronization signal block periodicity information. The OSI may carry at least one type of SIB information in system information blocks such as a SIB 2, a SIB 3, and a SIB 4; or may carry other system information. The system information may be used for cell handover, frequency switching, network switching, and the like. It should be understood that the embodiments of the present application may also be applied to another type of system information, for example, a SIB, a system information block, broadcast-based system information, or random access process request-based system information in LTE or NR. This is not limited in the present application. A person skilled in the art may understand that, in the present application, an embodiment in which RMSI is used as an example may also be applied to OSI or another type of system information, and an embodiment in which OSI is used as an example may also be applied to RMSI or another type of system information.

It should be noted that an index or a number in this application is merely an example for ease of description. A person skilled in the art may understand that another index value may alternatively be used. For example, another index value is used through standard protocol definition, pre-agreement between a base station and a terminal, pre-configuration, or the like, so that both communication parties have a consistent understanding.

The following describes the technical solutions of this application in detail by using specific embodiments with reference to the accompanying drawings. The following several specific embodiments may be combined with each other, and a same or similar concept or process may not be described repeatedly in some embodiments.

FIG. 4 is a flowchart of a system information redundancy version determining method according to an embodiment of this application. As shown in FIG. 4, the method in this embodiment may include the following parts.

Part 401: A communications device determines at least one time-domain resource unit Ux, where x may be understood as an identifier or an index of the time-domain resource unit.

Part 402: The communications device determines a redundancy version RVx for system information on the time-domain resource unit Ux according to the time-domain resource unit Ux, where the redundancy version RVx satisfies $RVx = *Int1(X1/X2*(Int2(x/M) \bmod K))) \bmod L$, x is a non-negative integer, X1 and X2 are non-zero real numbers, M is a positive real number, K and L are positive integers, mod indicates a modulo operation (where A mod B indicates that the modulo operation is performed on A by using B), Int1 indicates a rounding up or rounding down operation, and Int1 indicates a rounding up or rounding down operation. It may be understood as that x in RVx corresponds to x in Ux.

In the part 401, the time-domain resource unit represents a time length, for example, may be a symbol, a mini-slot, a slot, a subframe, a radio frame, a sampling point, or the like, and the non-negative integer x is an identifier or index of the time-domain resource unit. For example, if the time-domain resource unit is a radio frame, x may be an SFN (namely, a number of the radio frame). For example, if the time-domain resource unit is a slot, x may be a number of the slot. The time-domain resource unit may be used to send or receive the system information. It should be noted that when the communications device is a terminal device, the terminal device may receive the system information on the time-domain resource unit; or when the communications device is a network device, the network device may send the system information on the time-domain resource unit. It should be noted that, for ease of description, the time-domain resource unit Ux and the identifier or index x corresponding to the time-domain resource unit Ux may not be distinguished sometimes in this embodiment of the present application.

In FIG. 5A, a time-domain resource unit for sending or receiving RMSI is used as an example, and the time-domain resource unit is a radio frame. FIG. 5A shows 16 radio frames, and duration of each radio frame is 10 ms. The non-negative integer x in FIG. 5A identifies the 16 radio frames U0, U1, . . . , and U15 in FIG. 5A by using x=0, x=1, . . . , and x=1.5.

Figure 5B:
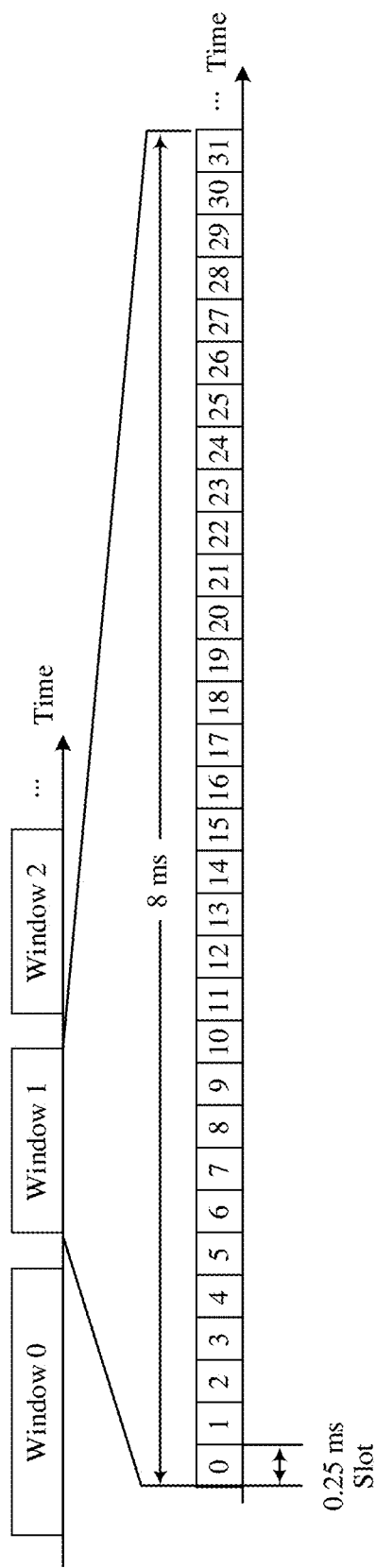
FIG. 5B is a schematic diagram of a time-domain resource unit for sending and receiving OSI.

In FIG. 5B, a time-domain resource unit for sending or receiving OSI is used as an example, and the time-domain resource unit is a slot. FIG. 5B shows an example in which there are 32 slots, and duration of each slot is 0.25 ms. The non-negative integer x in FIG. 5B identifies the 32 slots U0, U1, . . . , and U31 in FIG. 5B by using x=0, x=1, . . . , and x=31.

Optionally, the identifier x of the time-domain resource unit may be independently numbered in a time period. In other words, the identifier x of the time-domain resource unit may be a time-domain resource unit index or a time-domain resource unit number in the time period. For example, FIG. 5B shows three windows (namely, a window 0, a window 1, and a window 2) that are discrete in time. The window may be understood as a time period. For example, the window may be the system information window or the system information subwindow described in FIG. 3A and FIG. 3B. FIG. 5B shows that the window 1 includes 32 slots, and the non-negative integer x in FIG. 5B identifies the 32 slots in the window 1 by using x=0, x=1, . . . , and x=31 in FIG. 5B. For example, the window 0 includes 64 slots, and the window 2 includes 32 slots. In this case, the non-negative integer x identifies the 64 slots in the window 0 in FIG. 5B by using x=0, x=1, . . . , and x=63, and identifies the 32 slots in the window 2 in FIG. 5B by using x=0, x=1, . . . , and x=31. The quantity of windows, the positions of the windows, and the quantity of time-domain resource units in the window shown in FIG. 5B are merely examples. For example, the quantity of windows may be a value other than 3, the windows may be consecutive in time, the quantity of time-domain resource units in the window may be a value other than 32 and 64, and the time-domain resource unit in the window may be a symbol, a mini-slot, a slot, a subframe, a radio frame, a sampling point, or the like. If the window is the system information window described in FIG. 3A and FIG. 3B, a time length of the window may be 50 ms, 60 ms, 70 ms, 80 ms, 90 ms, 100 ms, 110 ms, 120 ms, 130 ms, 140 ms, 150 ms, 160 ms, 320 ms, 640 ms, or the like, for example, may be 80 ms or 160 ms, or 80 ms and 160 ms.

Optionally, the identifier x of the time-domain resource unit may alternatively be a downlink time-domain resource unit index or a downlink time-domain resource unit number in a time period, or a time-domain resource unit index that can be used for downlink transmission or a time-domain resource unit number that can be used for downlink transmission in a time period. The time period is similar to the descriptions in FIG. 5B, and details are not described herein again. The time-domain resource unit that can be used for downlink transmission may include at least one of a downlink time-domain resource unit and a flexible time-domain resource unit.

Optionally, the identifier x of the time-domain resource unit may alternatively be an index of an actually transmitted synchronization signal block, an index of a possibly transmitted synchronization signal block, an index of a system information subwindow, or an index of a system information subwindow associated with an actually transmitted or possibly transmitted synchronization signal block x, or an index of a beam sweeping periodicity.

Optionally, the identifier x of the time-domain resource unit may alternatively be associated with at least one of an index of an actually transmitted synchronization signal block, an index of a possibly transmitted synchronization signal block, an index of a system information subwindow, an index of a system information subwindow associated with an actually transmitted or possibly transmitted synchronization signal block, or an index of a beam sweeping periodicity. The association relationship may be understood as that after the at least one index is provided, the identifier x of the time-domain resource unit may be obtained by using a transformation relationship (for example, a function relationship) according to the at least one index.

Figure 6:
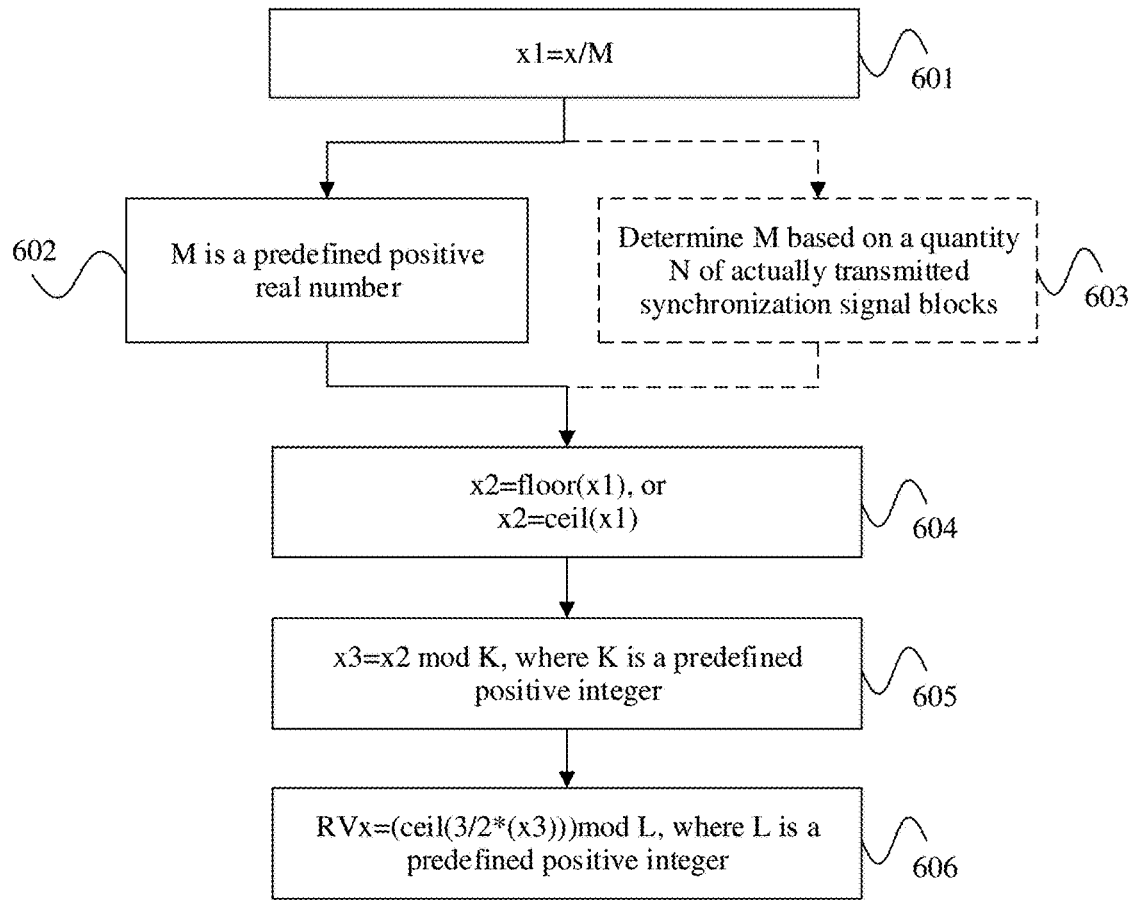
FIG. 6 is a detailed schematic flowchart of a system information redundancy version determining method according to an embodiment of this application.

In the pall 402, the communications device determines the redundancy version RVx for the system information on the time-domain resource unit Ux according to the time-domain resource unit Ux. FIG. 6 shows a detailed example of a procedure for determining the redundancy version RVx for the system information on the time-domain resource unit Ux. The procedure in FIG. 6 is described only by using the formula shown in the part 402 of FIG. 4 as an example. It may be understood that obtaining the technical effects provided in the embodiments of the present application by using another method or formula also falls within the protection scope of the present application.

In a part 601, a communications device determines a parameter x1 according to x/M, that is, x1=x/M, where M is a positive real number.

Further, M may be a predefined positive real number, that is, a part 602 is used. In a first example, M=2 is used as an example, and x1=x/2. In a part 604, the communications device rounds down the parameter x1 to obtain a parameter x2, and x2=floor(x1)=floor(x/2), where floor(Q2) represents that a rounding down operation is performed on Q2, and Q2 is a positive real number. The rounding down operation on Q2 may alternatively be represented by using [Q2]. Rounding down Q2 may alternatively be implemented by rounding up Q2 and then subtracting 1. If Q2 is an integer, floor(Q2) may also be understood as not performing a rounding down operation, that is, floor(Q2)=Q2. It should be additionally noted that, in this application, ceil(Q1) represents that a rounding up operation is performed on Q1, where Q1 is a positive real number. The rounding up operation on Q1 may alternatively be represented by using [Q1]. Rounding up Q1 may alternatively be implemented by rounding down Q1 and then adding 1. If Q1 is an integer, ceil(Q1) may also be understood as not performing a rounding up operation, that is, ceil(Q1)=Q1.

In parts 605 and 606, the communications device may determine a parameter x3 according to the parameter x2, and then determine the redundancy version RVx for the system information on the time-domain resource unit Ux according to the parameter x3. In the part 605, the communications device may determine the parameter x3 by performing a modulo operation on the parameter x2 by using K, where K is a predefined positive integer. For example, K may be a predefined quantity of RVs. For example, K is $_4$. It may be understood as that four RVs (for example, RV=0, RV=2, RV=3, and RV=1) are predefined, and x3=x2 mod K=x2 mod 4=floor(x/2) mod 4. It may be understood that a specific value of K is not limited in the part 605 in this embodiment of this application. For example, K may alternatively be 2 or 8. It may be understood as that two or eight RVs are predefined.

Further, in the part 606, the communications device may obtain the redundancy version RVx for the system information on the time-domain resource unit Ux according to RVx=(ceil(3/2*(x3))) mod L, where L is a predefined positive integer. For example, L may be a predefined quantity of RVs. For example, L is 4. It may be understood as that four RVs (for example, RV=0, RV=2, RV=3, and RV=1) are predefined, and RVx=(ceil(3/2*(x3))) mod L=(ceil(3/2*(floor(x/2) mod 4))) mod 4. It may be understood that a specific value of L is not limited in the part 606 in this embodiment of this application. For example, L may alternatively be 2. It may be understood as that two RVs are predefined. It may be understood that the foregoing formula may be understood as that X1 and X2 in the part 402 in FIG. 4 are respectively 3 and 2. In addition, in the part 606, the communications device may alternatively obtain the redundancy version RVx for the system information on the time-domain resource unit Ux according to another formula, for example, one of the following formulas:

RVx=ceil(3/2*(x3)) mod L, RVx=ceil(1/2*(x3)) mod L, RVx=ceil(5/2*(x3)) mod L, RVx=ceil(7/2*(x3)) mod L, RVx=ceil(1/3*(x3)) mod L, RVx=ceil(2/3*(x3)) mod L, RVx=ceil(4/3*(x3)) mod L, RVx=ceil(5/3*(x3)) mod L, RVx=ceil(7/3*(x3)) mod L, RVx=ceil(1/4*(x3)) mod L, RVx=ceil(3/4*(x3)) mod L, RVx=ceil(5/6*(x3)) mod L, RVx=ceil(7/6*(x3)) mod L, RVx=ceil(1/7*(x3)) mod L, RVx=ceil(2/7*(x3)) mod L, RVx=ceil(3/7*(x3)) mod L, RVx=ceil(4/7*(x3)) mod L, RVx=ceil(5/7*(x3)) mod L, RVx=ceil(6/7*(x3)) mod L, RVx=ceil(1/6*(x3)) mod L, RVx=ceil(5/6*(x3)) mod L, RVx=ceil(7/6*(x3)) mod L, RVx=ceil(1/7*(x3)) mod L, RVx=ceil(2/7*(x3)) mod L, RVx=ceil(3/7*(x3)) mod L, RVx=ceil(4/7*(x3)) mod L, RVx=ceil(5/7*(x3)) mod L, or RVx=ceil(6/7*(x3)) mod L. ceil in the foregoing formula may alternatively be replaced with floor, and X1 and X2 may alternatively have other values. In addition, X1/X2 may alternatively be understood as a whole. For example, X1/X2 may be a constant.

In a second example of the part 602, M=4 is used as an example, and x1=x/4. In a part 604, the communications device rounds up the parameter x1 to obtain a parameter x2, and x2=ceil(x1)=ceil(x/4), where ceil(Q2) represents that a rounding up operation is performed on Q2, and Q2 is a positive real number. Parts 605 and 606 are similar to the foregoing descriptions, and details are not described herein again. Therefore, it may be obtained that the redundancy version for the system information on the time-domain resource unit Ux is RVx=(ceil(3/2*(x3))) mod L=(ceil(3/2*(ceil(x/4) mod 4))) mod 4.

Figure 7A:
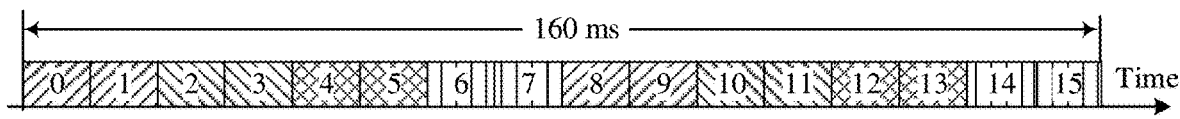
FIG. 7A is a schematic diagram of a first RMSI redundancy version determined by using a system information redundancy version determining method according to an embodiment of this application.

FIG. 7A is a schematic diagram of a redundancy version RVx for system information on a time-domain resource unit Ux according to the foregoing first and second examples. FIG. 7A shows an example in which the system information is RMSI, and 16 radio frames whose identifiers are x=0, x=1, . . . , and x=15 can carry a redundancy version RVx of the RMSI. All the 16 radio frames in FIG. 7A can support a valid RV of the RMSI. Therefore, beams in the 16 radio frames shown in the figure may be used for RMSI beamforming or beam sweeping. Compared with the existing solution shown in FIG. 3C, a quantity of beams that can be used to carry the RMSI is increased, thereby increasing coverage of the RMSI in beamforming or beam sweeping.

Figure 7B:
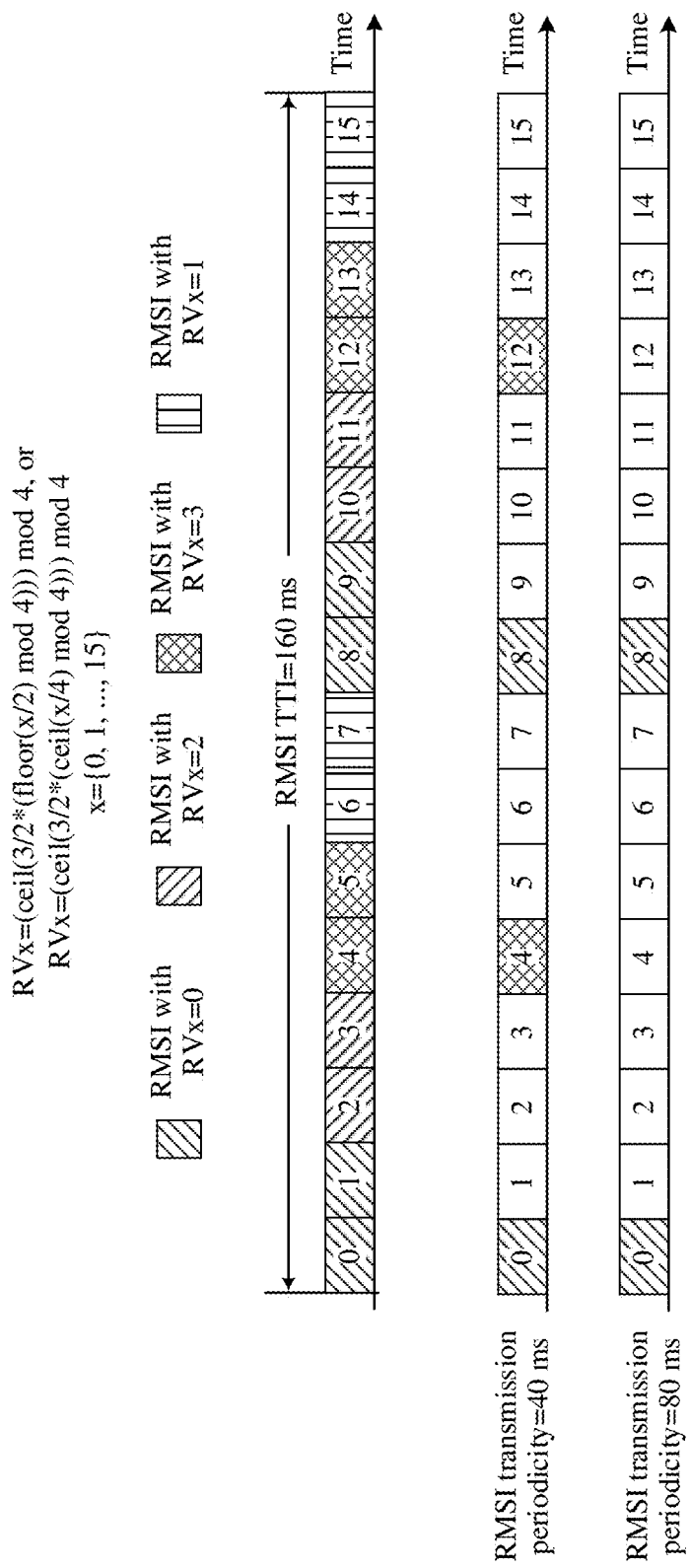
FIG. 7B is a schematic diagram of a first RMSI redundancy version determined by using a system information redundancy version determining method and transmission and reception of RMSI according to an embodiment of this application.

FIG. 7B shows, by using RMSI as an example, an RV of the RMSI on a PDSCH in one RMSI TTI. A redundancy version RVx of the RMSI on the time-domain resource unit Ux in FIG. 7B is consistent with that in FIG. 7A. For example, the RMSI TTI is 160 ms, and an RMSI transmission periodicity is 40 ms. The RMSI may be transmitted in radio frames whose identifiers are {x=0, x=$_4$, x=8, x=12} in one TTI. In addition, an RV of the RMSI on a PDSCH in radio frames whose identifiers are x=0 and x=8 is 0, and an RV of the RMSI on a PDSCH in radio frames whose identifiers are x=$_4$ and x=12 is 3. Two RVs are used in total to complete transmission and reception of the RMSI in one TTI. For example, the RMSI TTI is 160 ms, and an RMSI transmission periodicity is 80 ms. The RMSI may be transmitted in radio frames whose identifiers are {x=0, x=8} in one TTI, and an RV of the RMSI on a PDSCH in the radio frames whose identifiers are x=0 and x=8 is 0. One RV is used to complete transmission and reception of the RMSI in one TTI.

In a third example of the part 602, M=4 is used as an example, and x1=x/4. In a part 604, the communications device rounds down the parameter x1 to obtain a parameter x2, and x2=floor(x1)=floor(x/4). Parts 605 and 606 are similar to the foregoing descriptions, and details are not described herein again. Therefore, it may be obtained that the redundancy version for the system information on the time-domain resource unit Ux is RVx=(ceil(3/2*(floor(x/4) mod 4))) mod 4.

In a fourth example of the part 602, M=8 is used as an example, and x1=x/8. In a part 604, the communications device rounds up the parameter x1 to obtain a parameter x2, and x2=ceil(x1)=ceil(x/8). Parts 605 and 606 are similar to the foregoing descriptions, and details are not described herein again. Therefore, it may be obtained that the redundancy version for the system information on the time-domain resource unit Ux is RVx=(ceil(3/2*(ceil(x/8) mod 4))) mod 4.

Figure 8A:
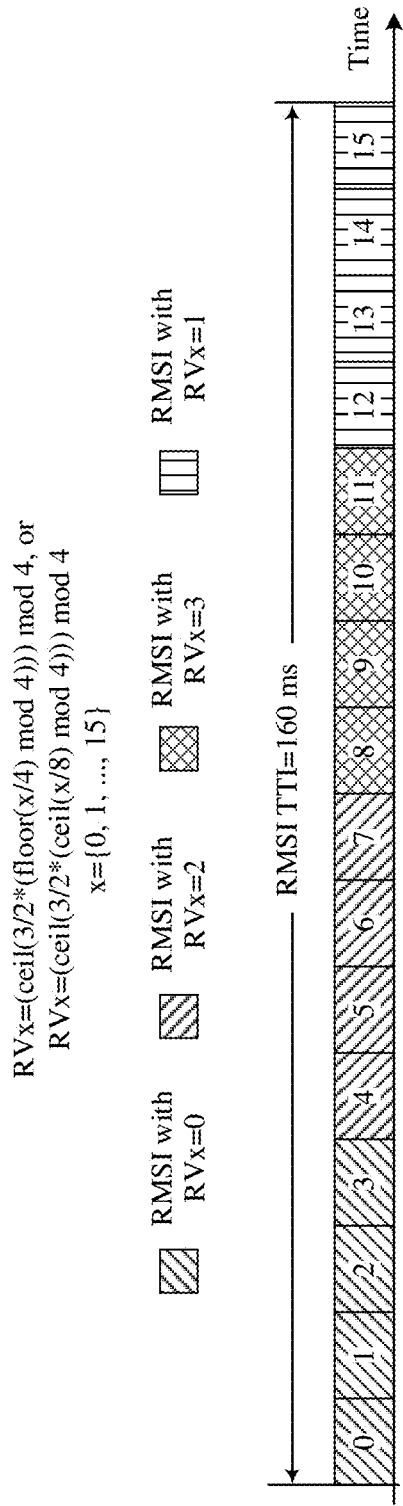
FIG. 8A is a schematic diagram of a second RMSI redundancy version determined by using a system information redundancy version determining method according to an embodiment of this application.

FIG. 8A is a schematic diagram of a redundancy version RVx for system information on a time-domain resource unit Ux according to the foregoing third and fourth examples. FIG. 8A shows an example in which the system information is RMSI, and 16 radio frames whose identifiers are x=0, x=1, . . . , and x=15 can carry a redundancy version RVx of the RMSI. All the 16 radio frames in FIG. 8A can support a valid RV of the RMSI. Therefore, beams in the 16 radio frames shown in the figure may be used for RMSI beamforming or beam sweeping. Compared with the existing solution shown in FIG. 3C, a quantity of beams that can be used to carry the RMSI is increased, thereby increasing coverage of the RMSI in beamforming or beam sweeping.

Figure 8B:
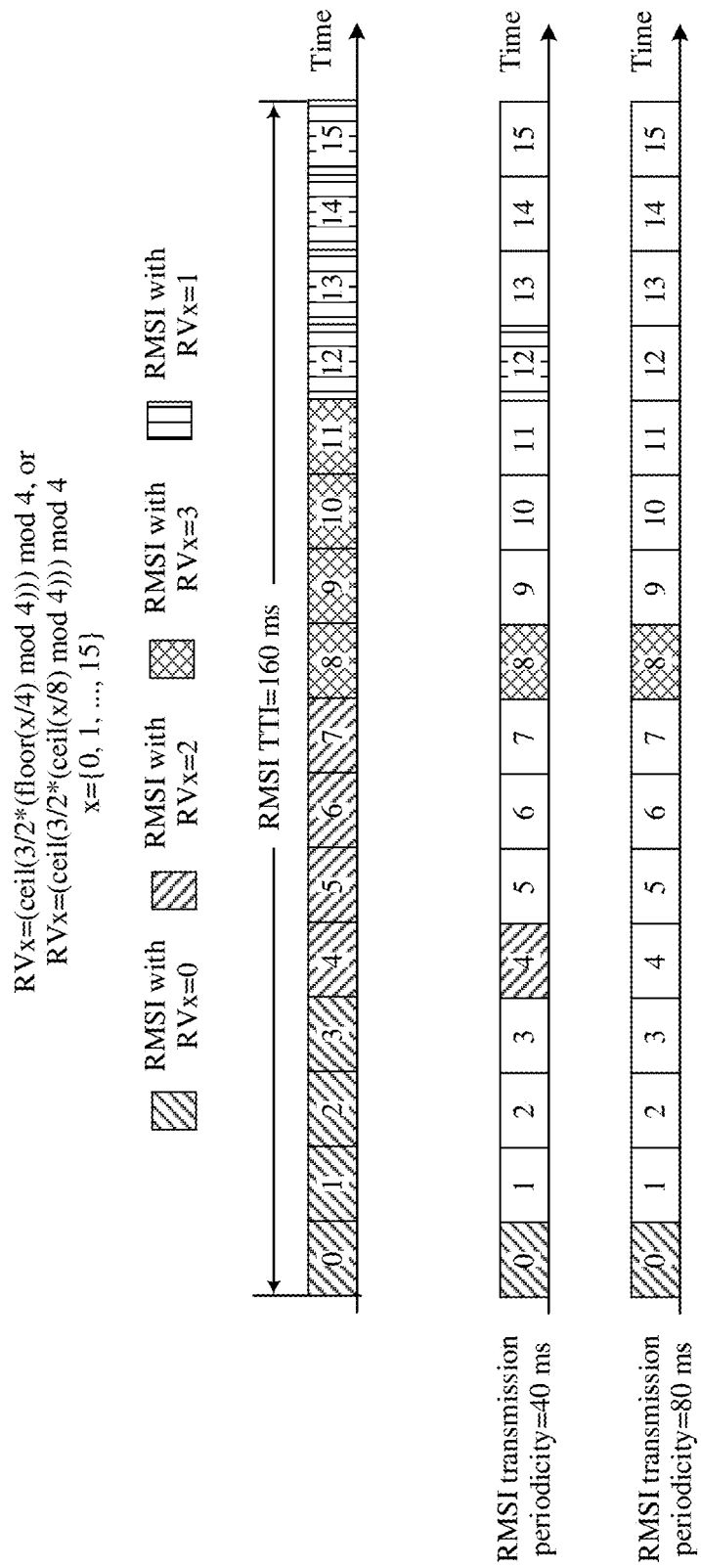
FIG. 8B is a schematic diagram of a second RMSI redundancy version determined by using a system information redundancy version determining method and transmission and reception of RMSI according to an embodiment of this application.

FIG. 8B shows, by using RMSI as an example, an RV of the RMSI on a PDSCH in one RMSI TTI. A redundancy version RVx of the RMSI on the time-domain resource unit Ux in FIG. 8B is consistent with that in FIG. 8A. For example, the RMSI TTI is 160 ms, and an RMSI transmission periodicity is 40 ms. The RMSI may be transmitted in radio frames whose identifiers are {x=0, x=$_4$, x=8, x=12} in one TTI, an RV of the RMSI on a PDSCH in the radio frame whose identifier is x=0 is 0, an RV of the RMSI on a PDSCH in the radio frame whose identifier is x=4 is 2, an RV of the RMSI on a PDSCH in the radio frame whose identifier is x=8 is 3, and an RV of the RMSI on a PDSCH in the radio frame whose identifier is x=12 is 1. Four RVs in total are used to complete transmission and reception of the RMSI in one TTI. For example, the RMSI TTI is 160 ms, and an RMSI transmission periodicity is 80 ms. The RMSI may be transmitted in radio frames whose identifiers are {x=0, x=8} in one TTI, an RV of the RMSI on a PDSCH in the radio frame whose identifier is x=0 is 0, and an RV of the RMSI on a PDSCH in the radio frame whose identifier is x=0 is 3. Two RVs in total are used to complete transmission and reception of the RMSI in one TTI. Compared with FIG. 7B, in the solution corresponding to FIG. 8B, in a case of the same RMSI transmission periodicity, when more redundancy versions are used to send and receive the RMSI in one TTI, an RV for sending and receiving the RMSI on one beam can be added in the RMSI TTI. In this way, a larger frequency selective gain can be provided.

In a fifth example of the part 602, M may alternatively be determined according to a system information (for example, RMSI) transmission periodicity. For example, if a unit of the time-domain resource unit Ux is a radio frame, and an RMSI transmission periodicity T1 is 10 ms, x1=x/M=x/i. For example, if a unit of the time-domain resource unit Ux is a radio frame, and an RMSI transmission periodicity T1 is 20 ms, x1=x/M=x/2. For example, if a unit of the time-domain resource unit Ux is a radio frame, and an RMSI transmission periodicity T1=40 ms, x1=x/M=x/4. For example, if a unit of the time-domain resource unit Ux is a radio frame, and an RMSI transmission periodicity T1 is 80 ms, x1=x/M=x/8, or x1=x/M=x/4. For example, if a unit of the time-domain resource unit Ux is a radio frame, and an RMSI transmission periodicity T1 is 80 ms, x1=x/M=x/8, or x1=x/M=x/4. For example, if a unit of the time-domain resource unit Ux is a radio frame, and an RMSI transmission periodicity T1 is 160 ms, x1=x/M=x/16, x1=x/M=x/8, or x1=x/M=x/4. It may be understood that, if a unit of the time-domain resource unit Ux is a slot, M needs to be determined according to a system information (for example, RMSI) transmission periodicity and a subcarrier spacing parameter. For example, if a unit of the time-domain resource unit Ux is a slot, an RMSI transmission periodicity T1 is 5 ms, and a subcarrier spacing is 15 kHz, x1=x/M=x/5. For example, if a unit of the time-domain resource unit Ux is a slot, an RMSI transmission periodicity T1 is 5 ms, and a subcarrier spacing is 30 kHz, x1=x/M=x/10. For example, if a unit of the time-domain resource unit Ux is a slot, an RMSI transmission periodicity T1 is 5 ms, and a subcarrier spacing is 60 kHz, x1=x/M=x/20. For example, if a unit of the time-domain resource unit Ux is a slot, an RMSI transmission periodicity T1 is 5 ms, and a subcarrier spacing is 120 kHz, x1=x/M=x/40. For example, if a unit of the time-domain resource unit Ux is a slot, an RMSI transmission periodicity T1 is 10 ms, and a subcarrier spacing is 15 kHz, x1=x/M=x/10. For example, if a unit of the time-domain resource unit Ux is a slot, an RMSI transmission periodicity T1 is 10 ms, and a subcarrier spacing is 30 kHz, x1=x/M=x/20. Parts 604, 605, and 606 are similar to the foregoing descriptions, and details are not described herein again. When the unit of the time-domain resource unit Ux is a slot, a value of M may alternatively be represented by using $M1*2^u$. When the subcarrier spacing is 15 kHz, 30 kHz, 60 kHz, or 120 kHz, u respectively corresponds to 0, 1, 2, and 3. A value of M1 may be 5 or 10.

In a sixth example of the part 602, a same value of the parameter M may be used for different system information transmission periodicities. For example, an RMSI transmission periodicity includes {5 ms, 10 ms, 20 ms, 40 ms, 80 ms, and 160 ms}. In a possible implementation, all RMSI transmission periodicities correspond to a same value of the parameter M. Using M=4 as an example, the value of M is 4 regardless of which one of the RMSI transmission periodicities {5 ms, 10 ms, 20 ms, 40 ms, 80 ms, 160 ms} is used. In another possible implementation, some RMSI transmission periodicities correspond to a same value of the parameter M. For example, when the RMSI transmission periodicities are {20 ms, 40 ms}, M=4 is used, and when the RMSI transmission periodicities are {80 ms, 160 ms}, M=2 is used. Parts 604, 605, and 606 are similar to the foregoing descriptions, and details are not described herein again.

In a seventh example of the part 602, values of the parameter M in different multiplexing manners of the system information and a synchronization signal block may be separately defined or configured (indicated). The different multiplexing manners of the system information and the synchronization signal block include time division multiplexing and frequency division multiplexing. Using an example in which the system information is RMSI, a multiplexing manner of the RMSI and the synchronization signal block includes time division multiplexing and frequency division multiplexing. In this case, respective values of the parameter M may be defined or configured (indicated) for transmission of the RMSI when the RMSI and the synchronization signal block are time division multiplexed and the RMSI and the synchronization signal block are frequency division multiplexed. For example, the value of M used for transmission of the RMSI when the RMSI and the synchronization signal block are time division multiplexed may be defined as M=2, and the value of M used for transmission of the RMSI when the RMSI and the synchronization signal block are frequency division multiplexed may be defined as M=4. For another example, the value of M used for transmission of the RMSI when the RMSI and the synchronization signal block are time division multiplexed may be defined as M=2, and the value of M used for transmission of the RMSI when the RMSI and the synchronization signal block are time division multiplexed may be determined according to an RMSI transmission periodicity. For another example, the value of M used for transmission of the RMSI when the RMSI and the synchronization signal block are time division multiplexed may be defined as M=4, and the value of M used for transmission of the RMSI or an RMSI transmission periodicity when the RMSI and the synchronization signal block are frequency division multiplexed may be configured or indicated by using DCI. For another example, the value of M used for transmission of the RMSI or an RMSI transmission periodicity when the RMSI and the synchronization signal block are time division multiplexed may be configured or indicated by using DCI, and the value of M used for transmission of the RMSI when the RMSI and the synchronization signal block are time division multiplexed may be defined as M=4. For another example, the value of M used for transmission of the RMSI or an RMSI transmission periodicity when the RMSI and the synchronization signal block are time division multiplexed may be configured or indicated by using DCI, and the value of M used for transmission of the RMSI when the RMSI and the synchronization signal block are time division multiplexed may be determined according to the RMSI transmission periodicity. Parts 604, 605, and 606 are similar to the foregoing descriptions, and details are not described herein again. It should be noted that when the value of M or the RMSI transmission periodicity is configured or indicated by using the DCI, some fields in the DCI may be reused, for example, one or more of the following fields are reused: {a field Redundancy version, a field HARQ process number, a field TPC command for PUCCH, a field Frequency domain resource assignment, a field ARI (ACK/NAK Resource Index), a field ARI HARQ timing indicator, a field Carrier indicator, a field BWP indicator, a field Time-domain PDSCH resources, a field VRB-to-PRB mapping, a field Reserved resource set on/off, a field Bundling size indicator, a field Modulation and coding scheme, second CW, a field New data indicator, second CW, a field Redundancy version, second CW, a field CBGFI, a field CBGTI, a field Downlink Assignment Index, a field Antenna port(s), a field Transmission Configuration Indication (TCI)}. It should be noted that a manner of rounding x1 is not limited in the part 604 in this embodiment of this application. Preferably, x1 is rounded down.

It may be understood that a specific value of M is not limited in the part 602 in this embodiment of this application. Preferably, the value of M may be one of {1, 2, 4, 5, 8, 16}, or may be determined according to the system information transmission periodicity. It may be understood that, in addition to the preferred value, M may alternatively be another positive real number. For example, M may be a quantity of time-domain resource units included in a system information subwindow.

According to the system information redundancy version determining method and apparatus provided in the embodiments of this application, the quantity of time-domain resource units that can carry the valid RV for the system information is increased, to resolve a problem that a quantity of beams that carry the system information is reduced because beams on some time-domain resource units cannot support the valid RV for the system information, thereby increasing coverage of the system information. In addition, in some implementations, an RV for sending and receiving the system information on one beam can be added in a system information window or a system information subwindow, thereby providing a larger frequency selective gain for receiving the system information.

Optionally, the value of M in the part 601 may not be determined in the manner described in the part 602, but is determined with reference to the part 603 in FIG. 6. In other words, the value of M may be determined according to a quantity N of actually transmitted synchronization signal blocks. For example, the value of M may alternatively be determined by the communications device according to at least one of {a quantity N of actually transmitted synchronization signal blocks, a quantity D of time-domain resource units included in a system information subwindow}. The quantity N of actually transmitted synchronization signal blocks may be notified by the network device to the terminal device. For example, in NR, the quantity N of actually transmitted synchronization signal blocks is notified by the network device to the terminal device by using RMSI. D may also represent a predefined constant, or one of a plurality of predefined constants. It should be noted that, when the part 603 is used, the implementation solution of this application shown in FIG. 6 may also be understood as that the communications device determines, according to at least one of {the quantity N of actually transmitted synchronization signal blocks, the quantity D of time-domain resource units included in the system information subwindow}, the redundancy version $RV_x$ for the system information on the time-domain resource unit $U_x$. It may be understood that the part 603 shows only one possible meaning of N. For example, N may alternatively indicate a quantity of possibly transmitted synchronization signal blocks.

In a first possible implementation of the part 603, M=N*D or M=n*N*D is used as an example, and n indicates a multiple of a beam sweeping periodicity. For example, the system information is OSI, the time-domain resource unit is a slot, a quantity D of slots included in an OSI subwindow is 1, a quantity N of actually transmitted synchronization signal blocks is 6, and n=1. In this case, M=6*1=6 and x1=x/6 may be obtained. It may be understood that, that the quantity N of actually transmitted synchronization signal blocks is 6 may also be understood as that N=6 beams are included, and one beam carries one actually transmitted synchronization signal block. In the part 604, the communications device rounds down the parameter x1 to obtain a parameter x2, and x2=floor(x1)=floor(x/6). Parts 605 and 606 are similar to the foregoing descriptions, and details are not described herein again. Therefore, it may be obtained that a redundancy version of the OSI in the slot $U_x$ is $RV_x$=(ceil(3/2*(floor(x/6) mod 4))) mod 4.

In a second possible implementation of the part 603, M=2*N*D is used as an example. For example, the system information is OSI, the time-domain resource unit is a slot, a quantity D of slots included in an OSI subwindow is 1, and a quantity N of actually transmitted synchronization signal blocks is 6. In this case, M=2*6*1=12 and x1=x/12 may be obtained. It may be understood that, that the quantity N of actually transmitted synchronization signal blocks is 6 may also be understood as that N=6 beams are included, and one beam carries one actually transmitted synchronization signal block. In the part 604, the communications device rounds up the parameter x1 to obtain a parameter x2, and x2=ceil(x1)= ceil(x/12). Parts 605 and 606 are similar to the foregoing descriptions, and details are not described herein again. Therefore, it may be obtained that a redundancy version of the OSI in the slot Ux is RVx=(ceil(3/2*(ceil(x/12) mod 4))) mod 4.

Figure 9A:
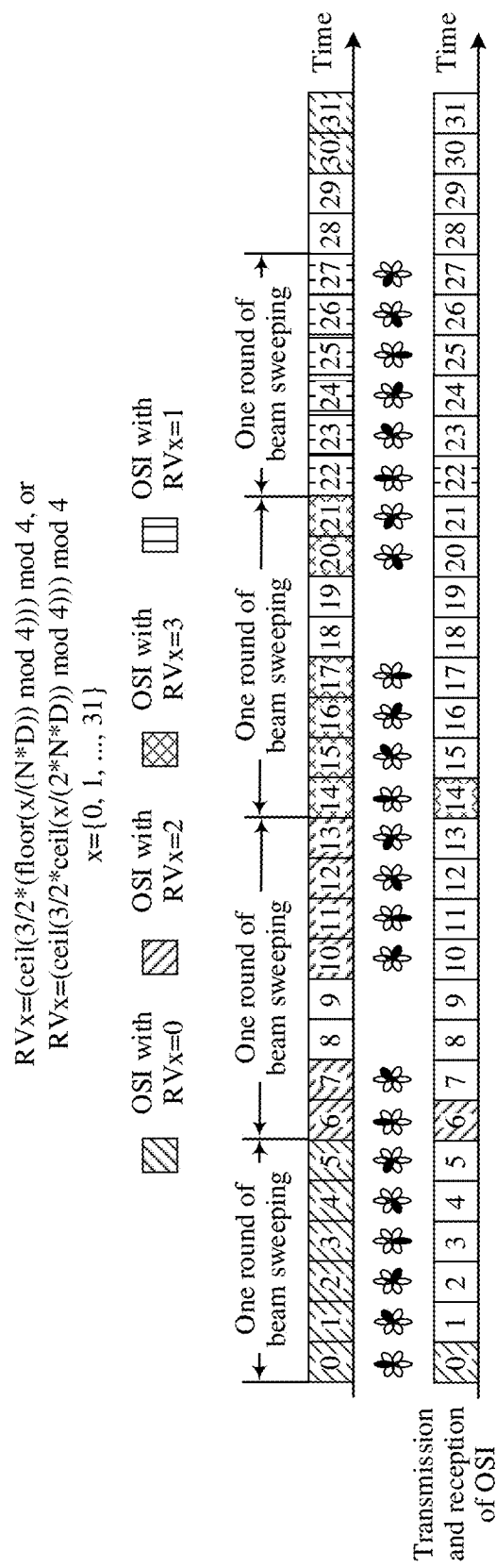
FIG. 9A is a schematic diagram of a first OSI redundancy version determined by using a system information redundancy version determining method and transmission and reception of OSI according to an embodiment of this application.

FIG. 9A is a schematic diagram of a redundancy version RVx of OSI in a slot Ux that is obtained according to the foregoing example. For example, there are 32 slots (a slot 0 to a slot 31), {slot 8, slot 9, slot 18, slot 19, slot 28, and slot 29} are used as uplink slots, other slots are downlink slots, and the OSI is carried in the downlink slots. In FIG. 9A, four rounds of beam sweeping are further used as an example. One round of beam sweeping includes N=6 beams, one beam is transmitted in one downlink slot, and the OSI may be carried by one or more of the six beams. FIG. 9A further shows, by using an example in which the OSI is carried by a vertical upward beam, slots for sending the OSI and RVs of the OSI in the four rounds of beam sweeping. For example, the OSI carried by the vertical upward beam is in slots {x=0, x=6, x=14, x=22}, and corresponding redundancy versions {RVx=0, RVx=2, RVx=3, RVx=1} are respectively used.

It should be noted that the OSI may alternatively be carried by another beam. It may be understood that the OSI is usually carried by a beam with a relatively good channel condition for sending. For example, a network device in an NR system may determine, in a synchronization process by sending a synchronization signal block and through feedback by a terminal device, a beam on which a condition of a channel between the network device and the terminal device is relatively good, and therefore, the OSI is carried by the corresponding beam. It may be understood that the feedback by the terminal device may be that the terminal device directly and explicitly feeds back an identifier of a beam with a relatively good channel condition to the network device, or may be that the terminal device implicitly notifies the network device of a beam with a relatively good channel condition by sending an uplink channel (for example, a random access channel) or an uplink signal (for example, a sounding reference signal).

Figure 9B:
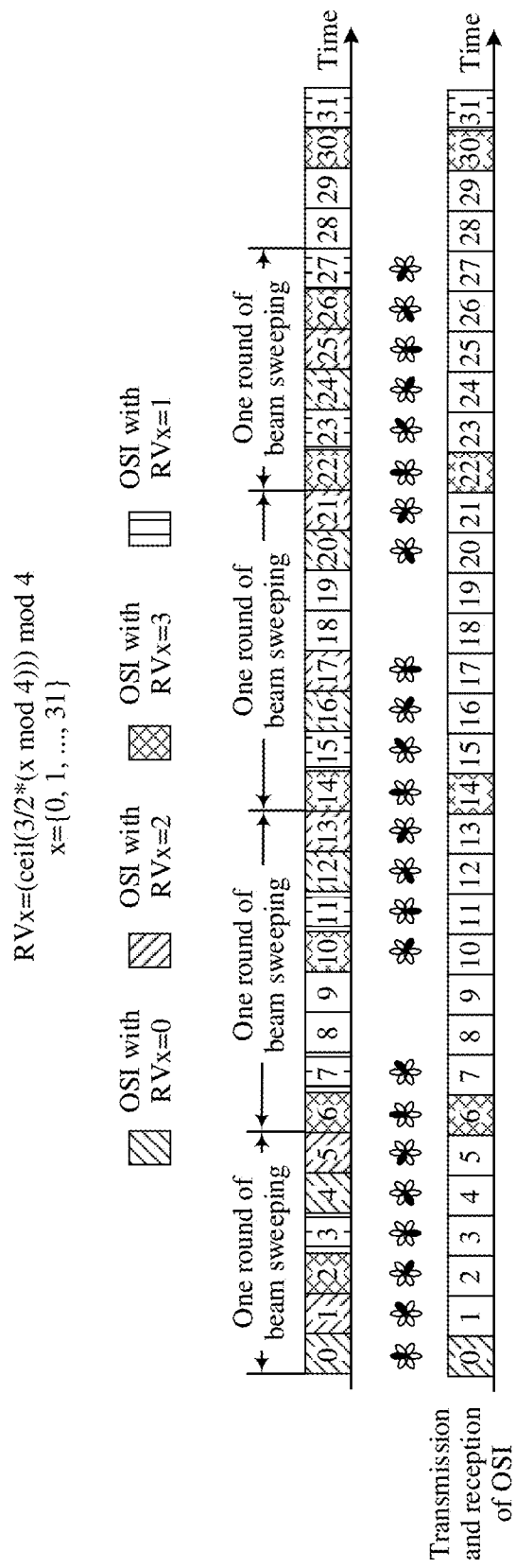
FIG. 9B is a schematic diagram of an OSI redundancy version determined by using another system information redundancy version determining method and transmission and reception of OSI.

FIG. 9B is a schematic diagram of a redundancy version RVx that is of OSI in a slot Ux and that is obtained by using another method, where a manner of determining RVx is RVx=(ceil(3/2*(x mod 4))) mod 4. Other content in FIG. 9B is similar to that in FIG. 9A. The OSI carried by a vertical upward beam shown in FIG. 9B is in slots {x=0, x=6, x=14, x=22}, and corresponding redundancy versions {RVx=0, RVx=3, RVx=3, RVx=3} are respectively used.

It can be learned from that, compared with the method provided in FIG. 9A, in FIG. 9B, more redundancy versions can be used to send and receive the OSI, and an RV for sending and receiving the OSI on one beam can be added to a system information window or a system information subwindow, thereby providing a larger frequency selective gain.

It should be noted that in the part 603, N may alternatively have another value, for example, N=2, 4, or 8, and D may alternatively have another value, for example, D=0.5, 2, or 4.

Figure 9C:
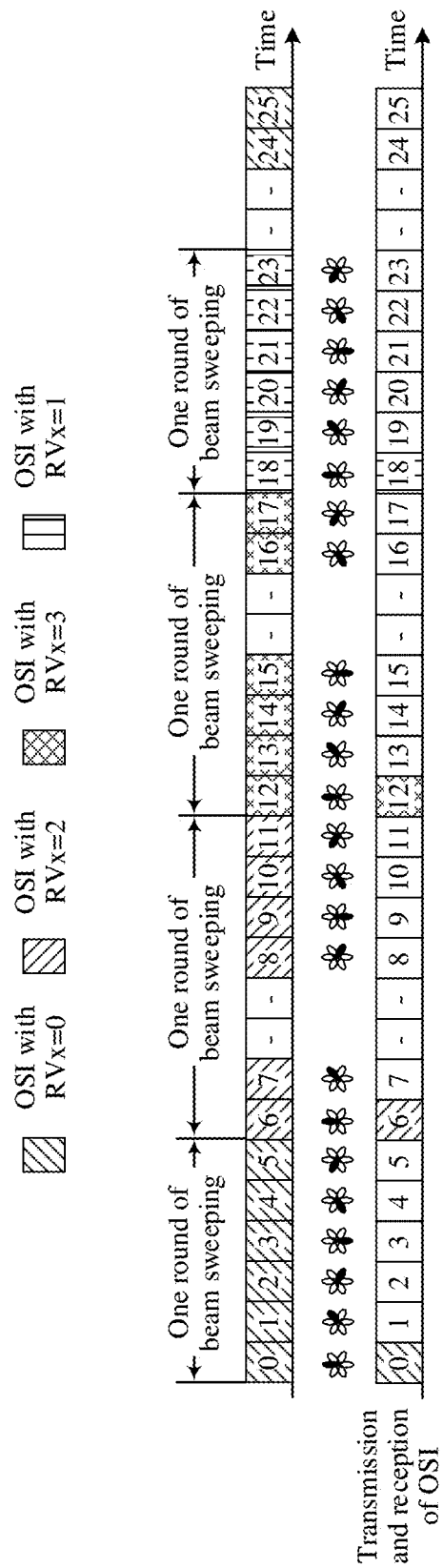
FIG. 9C is a schematic diagram of a second OSI redundancy version determined by using a system information redundancy version determining method and transmission and reception of OSI according to an embodiment of this application.

Optionally, FIG. 9C is a schematic diagram of a redundancy version RVx of OSI in a slot Ux in another case of a time-domain resource unit number or a time-domain resource unit index. For example, there are 32 slots (a slot U0 to a slot U31), {the slot U8, the slot U9, the slot U18, the slot U19, the slot U28, and the slot U29} are uplink slots, other slots are downlink slots, and the OSI is carried in the downlink slots. In FIG. 9C, x identifies only a slot that can carry the OSI, and a slot marked with '-' cannot carry the OSI. In FIG. 9C, four rounds of beam sweeping are still used as an example. One round of beam sweeping includes N=6 beams, one beam is transmitted in one downlink slot, and the OSI may be carried by one or more of the six beams. FIG. 9C further shows, by using an example in which the OSI is carried by a vertical upward beam, slots for sending the OSI and RVs of the OSI in the four rounds of beam sweeping. For example, the OSI carried by the vertical upward beam is in slots {x=0, x=6, x=12, x=18}, and corresponding redundancy versions {RVx=0, RVx=2, RVx=3, RVx=i} are respectively used.

Figure 9D:
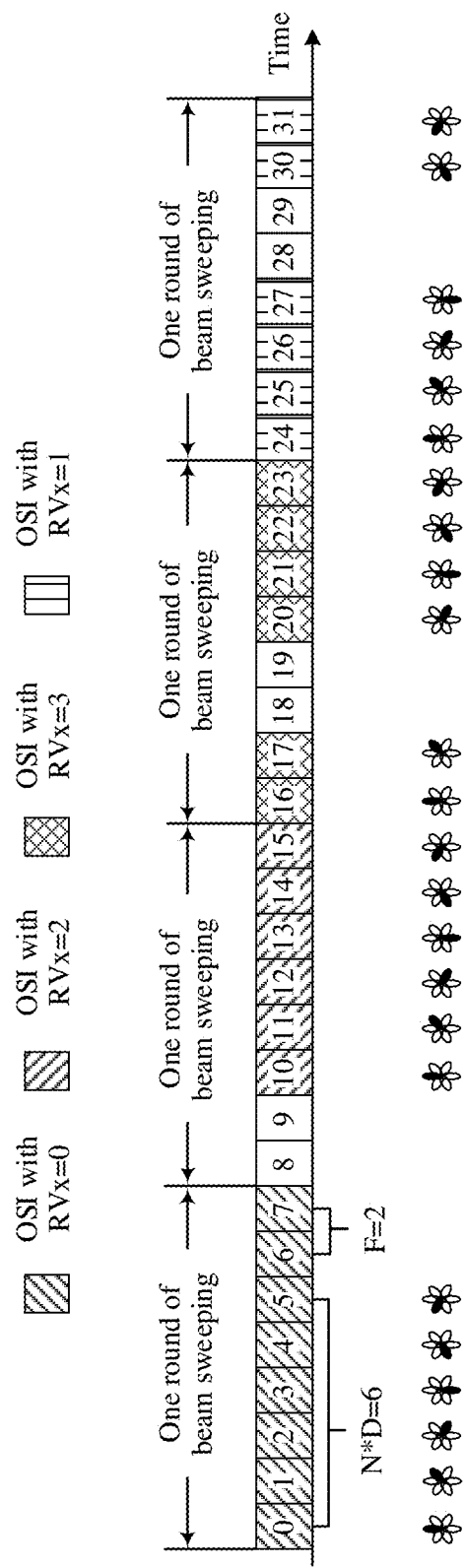
FIG. 9D is a schematic diagram of a third OSI redundancy version determined by using a system information redundancy version determining method according to an embodiment of this application.

In another possible implementation method of the part 603, M may alternatively be obtained according to another method. For example, M may be obtained by using M=N*D+F. FIG. 9D is a schematic diagram of a redundancy version RVx of OSI in a slot Ux when M is obtained by using M=N*D+F. Other conditions are the same as those in FIG. 9A. In FIG. 9D, F=2 is used as an example, and M=N*D+F=6*1+2=8. Parts 604, 605, and 606 are similar to the foregoing descriptions, and details are not described herein again. In this case, the illustration of the redundancy version RVx of the OSI in the slot Ux shown in FIG. 9D may be obtained. Compared with FIG. 9A, the rounds of beam sweeping in FIG. 9D include same quantities of time-domain resource units, but different rounds of beam sweeping in FIG. 9A may include different quantities of time-domain resource units. In this embodiment of this application, the redundancy version RVx of the OSI in the slot Ux is obtained by using M=N*D+F, and a same time for one round of beam sweeping can be implemented, so that the terminal device can more easily obtain a beam sweeping position, thereby simplifying implementation of the terminal device.

It should be noted that the part 603 in this embodiment of the present application does not limit the foregoing method for obtaining M. For example, M=f(N,D)+F may alternatively be used to obtain M. f(N, D) may be f(N, D)=N*D, or f(N, D)=floor(N*D), or f(N, D)=ceil(N*D). F is a non-negative integer configured by the network device or predefined. F may alternatively be obtained by using another method. For example, F may be obtained by using one of the following methods:

F=g(D, N, N_DL, N_UK)*N_UL,
F=g(D, N, N_DL, N_UK)*(N_UK+N_UL), and
F=g(D, N, N_DL, N_UK)*N_DU.

N_DL is a quantity of downlink time-domain resource units in a semi-persistent uplink and downlink resource allocation periodicity, N_UL is a quantity of uplink time-domain resource units in the semi-persistent uplink and downlink resource allocation periodicity, N_DU is a quantity of time-domain resource units in the semi-persistent uplink and downlink resource allocation periodicity, and N_UK is a quantity of flexible time-domain resource units in the semi-persistent uplink and downlink resource allocation periodicity. g(D, N, N_DL, N_UK) may be obtained by using one of the following methods:

f(N, D)/R, floor(f(N, D)/R), ceil(f(N, D)/R), where a value of R is one of N_DL, N_UK, and N_UK+N_DL.

It may be understood that in this embodiment of this application, in the part 605, x3 may alternatively be obtained according to another method. For example, one of the following methods may be used:

x3=x mod K, x3=floor(x/ceil(D))mod K, and x3=(x+z) mod K, where z may represent an offset value of the redundancy version, and the offset value may be an index of a beam sweeping periodicity in a system information window, or may be another constant.

According to the system information redundancy version determining method and apparatus provided in the embodiments of this application, the quantity of time-domain resource units that can carry the valid RV for the system information is increased, to resolve a problem that a quantity of beams that carry the system information is reduced because beams on some time-domain resource units cannot support the valid RV for the system information, thereby increasing coverage of the system information. In addition, in some implementations, an RV for sending and receiving the system information on one beam can be added in a system information window or a system information sub-window, thereby providing a larger frequency selective gain for receiving the system information.

To reduce a quantity of times of blind detection performed by the terminal device when the terminal device receives the system information, and reduce power consumption and complexity of the terminal device, this application provides a method for determining at least one time-domain resource unit Ux. It may be understood that the method may also be implemented in the part 401 in FIG. 4. In a possible implementation, the communications device may determine, according to the quantity N of synchronization signal blocks, the time-domain resource unit Ux carrying the system information, and the synchronization signal block may be an actually transmitted synchronization signal block, or may be a possibly transmitted synchronization signal block. Further, when beam sweeping is used, the time-domain resource unit Ux includes a start time-domain resource unit for the system information in one round of beam sweeping (which may also be understood as one beam sweeping periodicity) of the system information. For ease of description, a start time-domain resource unit for the system information in a $yt^h$ round of beam sweeping is identified as xyo. The start time-domain resource unit xyo may be understood as a start time-domain resource unit of the first PDCCH occasion of a PDCCH for the system information in the $y^{th}$ round of beam sweeping, or may also be understood as a start time-domain resource unit of a PDCCH occasion that is associated with or that corresponds to the first synchronization signal block and that is of the PDCCH for the system information in the $y^{th}$ round of beam sweeping.

For example, FIG. 9A shows a possible implementation. For example, four rounds of beam sweeping are performed on OSI, one round of beam sweeping includes N=6 beams, and a start time-domain resource unit in the first round of beam sweeping is a slot x10=0. In this case, a start time-domain resource unit for the OSI in the second round of beam sweeping is a slot x20=x10+N+j1=0+6+0=6, where j1 is a quantity of time-domain resource units that cannot carry the OSI in a time period of the first round of beam sweeping; a start time-domain resource unit for the OSI in the third round of beam sweeping is a slot x30=x20+N+j2=6+6+2=14, where j1 is a quantity of time-domain resource units that cannot carry the OSI in a time period of the second round of beam sweeping; and a start time-domain resource unit for the OSI in the fourth round of beam sweeping is a slot x40=x30+N+j3=14+6+2=22, where j3 is a quantity of time-domain resource units that cannot carry the OSI in a time period of the third round of beam sweeping.

For example, FIG. 9C provides another possible implementation. For example, four rounds of beam sweeping are performed on OSI, one round of beam sweeping includes N=6 beams, and a start time-domain resource unit in the first round of beam sweeping is a slot x10=0. In FIG. 9C, x identifies only a slot that can carry the OSI, and a slot marked with '-' cannot carry the OSI. In this case, a start time-domain resource unit for the OSI in the second round of beam sweeping is a slot x20=x10+N=0+6=6, a start time-domain resource unit for the OSI in the third round of beam sweeping is a slot X30=X20+N=6+6=12, and a start time-domain resource unit for the OSI in the fourth round of beam sweeping is a slot x40=x30+N=12+6=18.

It may be understood that the start time-domain resource unit in the first round of beam sweeping may alternatively be x10=x0+Offset, where x0 may be understood as a reference point, and may be a non-negative integer; and Offset may be understood as an offset between the start time-domain resource unit in the first round of beam sweeping and the reference point, and may be a non-negative integer. x10 may alternatively be understood as a start time-domain resource unit of a system information window or a start time-domain resource unit of the first round of beam sweeping in a system information window. Correspondingly, Offset may alternatively be understood as an offset between the start time-domain resource unit of the system information window and the reference point. In the foregoing example in which x10=0, it may be understood as that x0=0 and Offset=0. Other values and units of x0 and Offset are not limited in this embodiment of the present application. For example, Offset may alternatively be 5 ms.

It should be noted that a specific method for determining the time-domain resource unit Ux according to the quantity N of actually transmitted synchronization signal blocks is not limited in this embodiment of the present application. For example, the start time-domain resource unit index xyo for the system information in the $y^{th}$ round of beam sweeping may alternatively be obtained by using one of the following methods:

h(y, D, N, N_DL, N_UK)*N_DU+p(y, N, N_DL, N_UK) mod N_DU+Offset, h(y, D, N, N_DL, N_UK)*N_DU+p(y, D, N, N_DL, N_UK) mod N_DL+Offset, h(y, D, N, N_DL, N_UK)*N_DU+p(y, D, N, N_DL, N_UK) mod (N_DL+N_UK)+Offset, (h(y, D, N, N_DL, N_UK)*N_DU+p(y, D, N, N_DL, N_UK) mod N_DU+Offset) mod N_frame, (h(y, D, N, N_DL, N_UK)*N_DU+p(y, D, N, N_DL, N_UK) mod N_DL+Offset) mod N_frame, (h(y, D, N, N_DL, N_UK)*N_DU+p(y, D, N, N_DL, N_UK) mod (N_DL+N_UK)+Offset) mod N_frame, y*M+Offset, and (y*M+Offset) mod N_frame.

N_frame may be a quantity of slots or a quantity of subframes in one radio frame. Offset is an optional parameter. Optionally, using an example in which a unit of Offset is a slot, Offset may be any integer in 0 to 80. Optionally, using an example in which a unit of Offset is ms, Offset may be any integer in 0 to 10, or may be any real number in 0 to 10 with one decimal place. M may be obtained by using the method described in the part 602 or the part 603, and details are not described herein again.

h(y, D, N, N_DL, N_UK) and p(y, D, N, N_DL, N_UK) in the foregoing method may be obtained by using one of the following methods, and h(y, D, N, N_DL, N_UK) and p(y, D, N, N_DL, N_UK) may be obtained by using a same method or different methods.

y*f(D, N)/R, floor(y*f(D, N))/R, ceil(y*f(D, N))/R, floor (y*D)*N/R, ceil(y*D)*N/R, floor(floor(y*f(D, N))/R), floor (ceil(y*f(D, N))/R), floor(y*f(D, N))/R), floor(floor(y*D) *N/R), floor(ceil(y*D)*N/R), ceil (floor(y*f(D, N))/R), ceil (ceil(y*f(D, N))/R), ceil(y*f(D, N)/R), ceil(floor(y*D)*N/ R), and ceil(ceil(y*D)*N/R), where a value of R is one of N_DL, N_UK, and N_UK+N_DL.

In the part 401 of FIG. 4, the communications device needs to determine at least one time-domain resource unit Ux. In a possible implementation, the communications device may determine, according to the quantity N of synchronization signal blocks, the time-domain resource unit Ux carrying the system information, and the synchronization signal block may be an actually transmitted synchronization signal block, or may be a possibly transmitted synchronization signal block. Further, when beam sweeping is used, the time-domain resource unit Ux includes at least one time-domain resource unit for the system information in one round of beam sweeping (which may also be understood as one beam sweeping periodicity) of the system information. For ease of description, at least one time-domain resource unit for the system information in a $y^{th}$ round of beam sweeping is identified as xyj. A time-domain resource unit xyo indicates a start time-domain resource unit for the system information in the $y^{th}$ round of beam sweeping. For a method for obtaining the time-domain resource unit xyo, refer to the foregoing descriptions, and details are not described herein again. The time-domain resource unit xyj (where j is a positive integer) represents a $j^{th}$ time-domain resource unit other than the start time-domain resource unit xyo in the $y^{th}$ round of beam sweeping of the system information, and j may alternatively be an index of an SS/PBCH block that is actually sent or possibly sent, or may be an index of the system information. The time-domain resource unit xyj may be understood as a start time-domain resource unit of a PDCCH occasion that is other than the first PDCCH occasion and that is of a PDCCH for the system information in the $yt^h$ round of beam sweeping, and may alternatively be understood as a start time-domain resource unit of a PDCCH occasion that is associated with or that corresponds to a synchronization signal block other than the first synchronization signal block and that is of a PDCCH for the system information in the $yt^h$ round of beam sweeping. xyj may be obtained by using one of the following methods:

(xyo+f(j, D)) mod N_frame, (xyo+f(j, D)+Oj) mod N_frame, floor(q(y, M, j, D)/R)*N_DU+r(y, M, j, D) mod N_DU, (floor(q(y, M, j, D)/R)*N_DU+r(y, M, j, D) mod N_DU) mod N_frame, floor(q(y, M, j, D)/R)*N_DU+r(y, M, j, D) mod R, (floor(q(y, M, j, D)/R)*N_DU+r(y, M, j, D) mod R) mod N_frame, floor(q(y, M, j, D)/R)*N_DU+r(y, M, j, D) mod N_DU+Offset, (floor(q(y, M, j, D)/R)*N_DU+r(y, M, j, D) mod N_DU+Offset) mod N_frame, floor(q(y, M, j, D)/R)*N_DU+r(y, M, j, D) mod R+Offset, and (floor(q(y, M, j, D)/R)*N_DU+r(y, M, j, D) mod R+Offset) mod N_frame.

M may be obtained by using the method described in the part 602 or the part 603, and details are not described herein again. q(y, M, j, D) and r(y, M, j, D) may be obtained by using one of the following methods, and q(y, M, j, D) and r(y, M, j, D) may be obtained by using a same method or different methods:

y*M+f(j, D), floor(y*M+f(j, D)), and ceil(y*M+f(j, D)).

Oj may represent a quantity of time-domain resource units, in the $y^{th}$ round of beam sweeping, on which the system information cannot be transmitted, other than the start time-domain resource unit xyo to the time-domain resource unit xyj. Oj may be obtained by using one of the following methods:

Oj=floor(f(j, M)/R)*S, Oj=ceil(f(j, M)/R)*S, Oj=floor ((xyo mod N_DU+f(j, D))/N_DL)*N_UL, and Oj=ceil ((xyo mod N_DU+f(j, D))/N_DL)*N_UL, where value of S is one of N_UL, N_UK, and N_UK+N_UL. It may be understood that Oj may be a mandatory parameter, or may be an optional parameter.

In another possible implementation, a position of the start time-domain resource unit xyo in the $y^{th}$ round of beam sweeping during beam sweeping of the system information is fixed, and it may be understood as that a position of a start time-domain resource unit in one round of sweeping during beam sweeping of the system information is predefined. For example, the position may be at least one or one of a start position, a middle position, a 1/4 position, and a 3/4 position of a system information window or a system information subwindow.

For example, if a length of the system information window is 20 ms, the start position, the middle position, the 1/4 position, and the 3/4 position are respectively four positions of the system information window: 0 ms, 5 ms, 10 ms, and 15 ms. In a possible implementation, an example in which one of the four positions is predefined is used. For example, a position of 0 ms is predefined. In this case, a start time-domain resource unit for the system information in one round of beam sweeping is always the first time-domain resource unit in the system information window. In another possible implementation, an example in which at least one of the four positions is predefined is used. For example, two positions 0 ms and 10 ms are predefined. In this case, the terminal device further needs to determine, according to other configuration information, whether the position 0 ms or 10 ms should be used. For example, the terminal device may determine, according to a quantity of actually transmitted synchronization signal blocks and a length of the system information window, whether the position 0 ms or 10 ms should be used.

In another possible implementation, a position of the start time-domain resource unit xyo in the $y^{th}$ round of beam sweeping during beam sweeping of the system information may alternatively be configured or indicated by the network device. The network device may configure or indicate, by using at least one of RMSI, OSI, a Media Access Control element (Media Access Control-Control Element, MAC-CE), radio resource control (Radio Resource Control, RRC) signaling, and downlink control information (Downlink Control Information, DCI), a position of a start time-domain resource unit in one round of sweeping during beam sweeping of the system information.

According to the method and the apparatus provided in the embodiments of this application, the at least one time-domain resource unit in one round of sweeping during beam sweeping of the system information is determined, so that a quantity of times that the terminal device blindly detects the system information can be reduced, thereby reducing power consumption and complexity of the terminal device.

Figure 10:
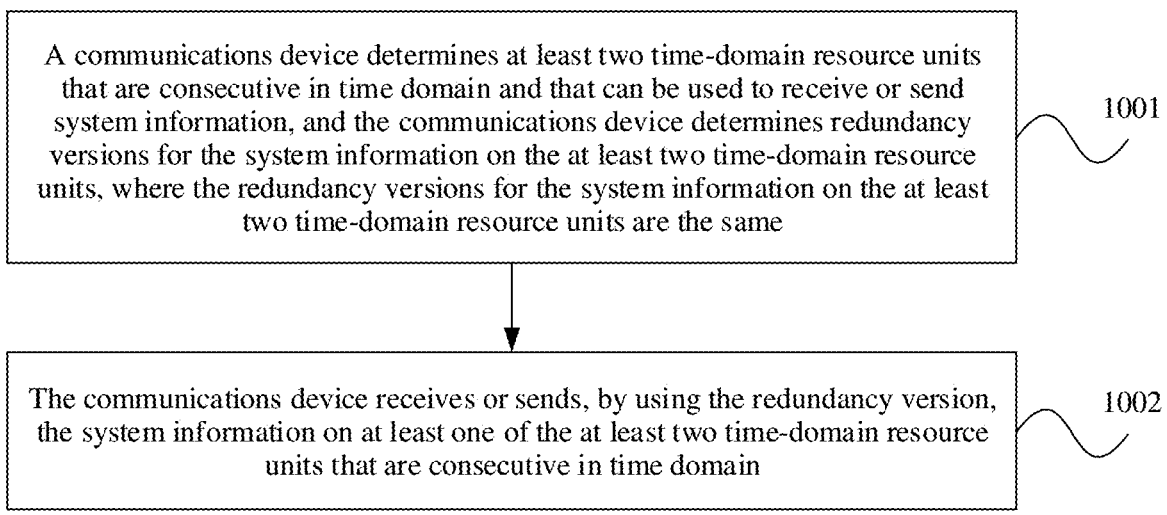
FIG. 10 is a schematic flowchart of determining a system information redundancy version and sending and receiving system information according to an embodiment of this application.

FIG. 10 is a flowchart of a system information sending and receiving method according to an embodiment of this application. As shown in FIG. 10, the method in this embodiment may include the following parts.

Part 1001: A communications device determines at least two time-domain resource units that are consecutive in time domain and that can be used to receive or send system information, and the communications device determines redundancy versions for the system information on the at least two time-domain resource units, where the redundancy versions for the system information on the at least two time-domain resource units are the same.

Part 1002: The communications device receives or sends, by using the redundancy version, the system information on at least one of the at least two time-domain resource units that are consecutive in time domain.

It should be noted that the at least two time-domain resource units that are consecutive in time domain in the part 1001 may be understood as that the at least two time-domain resource units are consecutive in time domain after some time-domain resource units (for example, time-domain resource units that cannot carry the system information) are excluded in time domain. FIG. 9A is used as an example. For example, the system information is OSI, and the time-domain resource unit is a slot. For example, six slots whose identifiers are {x=8, x=9, x=18, x=19, x=28, x=29} in FIG. 9A are uplink slots. In this case, the six slots cannot carry the OSI, after the foregoing six slots are excluded in time domain, six slots whose identifiers are {x=6, x=7, x=10, x=11, x=12, x=13} may be considered to be consecutive in time domain, and six slots whose identifiers are {x=14, x=15, x=16, x=17, x=20, x=21} may also be considered to be consecutive in time domain. Certainly, in FIG. 9A, six slots whose identifiers are {x=0, x=1, x=2, x=3, x=4, x=5} are consecutive in time domain, and six slots whose identifiers are {x=22, x=23, x=24, x=25, x=26, x=27} are also consecutive in time domain.

In the part 1001, the communications device may determine the redundancy version for the system information on the time-domain resource unit according to the methods shown and described in FIG. 4, FIG. 6, FIG. 7A, FIG. 8A, FIG. 9A, FIG. 9C, and FIG. 9D.

In a possible implementation, FIG. 4, FIG. 6, and FIG. 7A are used as an example. For example, the system information is RMSI, and the time-domain resource unit is a radio frame. The at least two time-domain resource units in the part 1001 may be understood as two radio frames whose identifiers are {x=0, x=1} in FIG. 7A, and the two radio frames whose identifiers are {x=0, x=1} are consecutive in time domain. According to the methods shown and described in FIG. 4, FIG. 6, and FIG. 7A, redundancy versions for the system information in the two radio frames whose identifiers are {x=0, x=1} are all a redundancy version 0. The at least two time-domain resource units in the part 1001 may alternatively be understood as two radio frames whose identifiers are {x=2, x=3} in FIG. 7A, and two radio frames whose identifiers are {x=2, x=3} are consecutive in time domain. According to the methods shown and described in FIG. 4, FIG. 6, and FIG. 7A, redundancy versions for the system information in the two radio frames whose identifiers are {x=2, x=3} are all a redundancy version 2. The at least two time-domain resource units in the part 1001 may alternatively be understood as two radio frames whose identifiers are {x=4, x=5} in FIG. 7A, and the two radio frames whose identifiers are {x=4, x=5} are consecutive in time domain. According to the methods shown and described in FIG. 4, FIG. 6, and FIG. 7A, redundancy versions for the system information in the two radio frames whose identifiers are {x=4, x=5} are all a redundancy version 3. The at least two time-domain resource units in the part 1001 may alternatively be understood as two radio frames whose identifiers are {x=6, x=7} in FIG. 7A, and the two radio frames whose identifiers are {x=6, x=7} are consecutive in time domain. According to the methods shown and described in FIG. 4, FIG. 6, and FIG. 7A, redundancy versions for the system information in the two radio frames whose identifiers are {x=6, x=7} are all a redundancy version 1.

In another possible implementation, FIG. 4, FIG. 6, and FIG. 8A are used as an example. For example, the system information is RMSI, and the time-domain resource unit is a radio frame. The at least two time-domain resource units in the part 1001 may be understood as four radio frames whose identifiers are {x=0, x=1, x=2, x=3} in FIG. 8A, and the four radio frames whose identifiers are {x=0, x=1, x=2, x=3} are consecutive in time domain. According to the methods shown and described in FIG. 4, FIG. 6, and FIG. 8A, redundancy versions for the system information in the four radio frames whose identifiers are {x=0, x=1, x=2, x=3} are all a redundancy version 0. The at least two time-domain resource units in the part 1001 may alternatively be understood as four radio frames whose identifiers are {x=4, x=5, x=6, x=7} in FIG. 8A, and the four radio frames whose identifiers are {x=4, x=5, x=6, x=7} are consecutive in time domain. According to the methods shown and described in FIG. 4, FIG. 6, and FIG. 8A, redundancy versions for the system information in the four radio frames whose identifiers are {x=4, x=5, x=6, x=7} are all a redundancy version 2. The at least two time-domain resource units in the part 1001 may alternatively be understood as four radio frames whose identifiers are {x=8, x=9, x=10, x=11} in FIG. 8A, and the four radio frames whose identifiers are {x=8, x=9, x=10, x=11} are consecutive in the time domain. According to the methods shown and described in FIG. 4, FIG. 6, and FIG. 8A, redundancy versions for the system information in the four radio frames whose identifiers are {x=8, x=9, x=10, x=11} are all a redundancy version 3. The at least two time-domain resource units in the part 1001 may alternatively be understood as four radio frames whose identifiers are {x=12, x=13, x=14, x=15} in FIG. 8A, and the four radio frames whose identifiers are {x=12, x=13, x=14, x=15} are consecutive in the time domain. According to the methods shown and described in FIG. 4, FIG. 6, and FIG. 8A, redundancy versions for the system information in the four radio frames whose identifiers are {x=12, x=13, x=14, x=15} are all a redundancy version 1.

In still another possible implementation, FIG. 4, FIG. 6, and FIG. 9A are used as an example. For example, the system information is OSI, and the time-domain resource unit is a slot. The at least two time-domain resource units in the part 1001 may be understood as six slots whose identifiers are {x=0, x=1, x=2, x=3, x=4, x=5} in FIG. 9A, and the six slots whose identifiers are {x=0, x=1, x=2, x=3, x=4, x=5} are consecutive in time domain. According to the methods shown and described in FIG. 4, FIG. 6, and FIG. 9A, redundancy versions for the system information in the six slots whose identifiers are {x=0, x=1, x=2, x=3, x=4, x=5} are all a redundancy version 0. The at least two time-domain resource units in the part 1001 may alternatively be understood as six slots whose identifiers are {x=6, x=7, x=10, x=11, x=12, x=13} in FIG. 9A, and the six slots whose identifiers are {x=6, x=7, x=10, x=11, x=12, x=13} are consecutive in time domain. According to the methods shown and described in FIG. 4, FIG. 6, and FIG. 9A, redundancy versions for the system information in the six slots whose identifiers are {x=6, x=7, x=10, x=11, x=12, x=13} are all a redundancy version 2. The at least two time-domain resource units in the part 1001 may alternatively be understood as six slots whose identifiers are {x=14, x=15, x=16, x=17, x=20, x=21} in FIG. 9A, and the six slots whose identifiers are {x=14, x=15, x=16, x=17, x=20, x=21} are consecutive in time domain. According to the methods shown and described in FIG. 4, FIG. 6, and FIG. 9A, redundancy versions for the system information in the six slots whose identifiers are {x=14, x=15, x=16, x=17, x=20, x=21} are all a redundancy version 3. The at least two time-domain resource units in the part 1001 may alternatively be understood as six slots whose identifiers are {x=22, x=23, x=24, x=25, x=26, x=27} in FIG. 9A, and the six slots whose identifiers are {x=22, x=23, x=24, x=25, x=26, x=27} are consecutive in time domain. According to the methods shown and described in FIG. 4, FIG. 6, and FIG. 9A, redundancy versions for the system information in the six slots whose identifiers are {x=22, x=23, x=24, x=25, x=26, x=2'7} are all a redundancy version 1.

Optionally, the at least two time-domain resource units in the part 1001 may belong to one time-domain resource unit set, and the time-domain resource unit set may have a plurality of possible forms. For example:

The time-domain resource unit set may include a plurality of radio frames, and the time-domain resource unit included in the time-domain resource unit set may be a symbol, a mini-slot, a slot, a subframe, a radio frame, or the like.

The time-domain resource unit set may alternatively include one radio frame, and the time-domain resource unit included in the time-domain resource unit set may be a symbol, a mini-slot, a slot, a subframe, or the like.

The time-domain resource unit set may alternatively include a plurality of subframes, and the time-domain resource unit included in the time-domain resource unit set may be a symbol, a mini-slot, a slot, a subframe, or the like.

The time-domain resource unit set may alternatively include one subframe, and the time-domain resource unit included in the time-domain resource unit set may be a symbol, a mini-slot, a slot, or the like.

The time-domain resource unit set may alternatively include a plurality of slots, and the time-domain resource unit included in the time-domain resource unit set may be a symbol, a mini-slot, a slot, or the like.

The time-domain resource unit set may alternatively include one slot, and the time-domain resource unit included in the time-domain resource unit set may be a symbol, a mini-slot, or the like.

The time-domain resource unit set may alternatively include a plurality of mini-slots, and the time-domain resource unit included in the time-domain resource unit set may be a symbol, a mini-slot, or the like.

The time-domain resource unit set may alternatively include one mini-slot, and the time-domain resource unit included in the time-domain resource unit set may be a symbol or the like.

The time-domain resource unit set may alternatively include a plurality of symbols, and the time-domain resource unit included in the time-domain resource unit set may be a symbol or the like.

The time-domain resource unit set may alternatively include one or more system information occasions. The system information occasion may be understood as time-domain resource unit sets that are discrete or consecutive in time domain, and the system information occasion may carry a PDCCH for the system information and/or a PDSCH for the system information. The time-domain resource unit included in the time-domain resource unit set may be a symbol, a mini-slot, a slot, a subframe, a radio frame, or the like. Using FIG. 3B as an example, a time-domain resource unit set including radio frames U0 and U1 and a time-domain resource unit set including radio frames U16 and U17 are discrete in time domain. Using FIG. 13 as an example, a time-domain resource unit set including radio frames U0 and U1 and a time-domain resource unit set including radio frames U2 and U3 are consecutive in time domain.

The time-domain resource unit set may alternatively include one or more system information windows, and the time-domain resource unit included in the time-domain resource unit set may be a symbol, a mini-slot, a slot, a subframe, a radio frame, or the like.

The time-domain resource unit set may alternatively include one or more system information subwindows, and the time-domain resource unit included in the time-domain resource unit set may be a symbol, a mini-slot, a slot, a subframe, a radio frame, or the like.

The time-domain resource unit set may alternatively include one or more beam sweeping periodicities, and the time-domain resource unit included in the time-domain resource unit set may be a symbol, a mini-slot, a slot, a subframe, a radio frame, or the like.

It should be understood that, in FIG. 7A, FIG. 7B, FIG. 8A, FIG. 8B, FIG. 9A, FIG. 9C, and FIG. 9D, an example in which an occurrence sequence of four redundancy versions in time domain is {0, 2, 3, 1} is used to implement the part 1001, and an occurrence sequence of redundancy versions in time domain in a specific embodiment is not limited in the present application. For example, one of the following occurrence sequences may be used:

{0, 2, 3, 1}, {0, 2, 1, 3}, {0, 1, 2, 3}, {0, 1, 3, 2}, {0, 3, 1, 2}, {0, 3, 2, 1}, {1, 0, 3, 2}, {1, 0, 2, 3}, {1, 2, 0, 3}, {1, 2, 3, 0}, {1, 3, 2, 0}, {1, 3, 0, 2}, {2, 0, 3, 1}, {2, 0, 1, 3}, {2, 1, 0, 3}, {2, 1, 3, 0}, {2, 3, 1, 0}, {2, 3, 0, 1}, {3, 0, 2, 1}, {3, 0, 1, 2}, {3, 1, 2, 0}, {3, 1, 0, 2}, {3, 2, 0, 1}, or {3, 2, 1, 0}.

In addition, it should be understood that in FIG. 7A, FIG. 7B, FIG. 8A, FIG. 8B, FIG. 9A, FIG. 9B, FIG. 9C, and FIG. 9D, four redundancy versions are used as an example to implement the part 1001, a quantity of redundancy versions in a specific embodiment is not limited in the present application. In the part 1001, the communications device may alternatively determine, by using another quantity of redundancy versions, a redundancy version for the system information on the time-domain resource unit included in the time-domain resource unit set.

Figure 11:
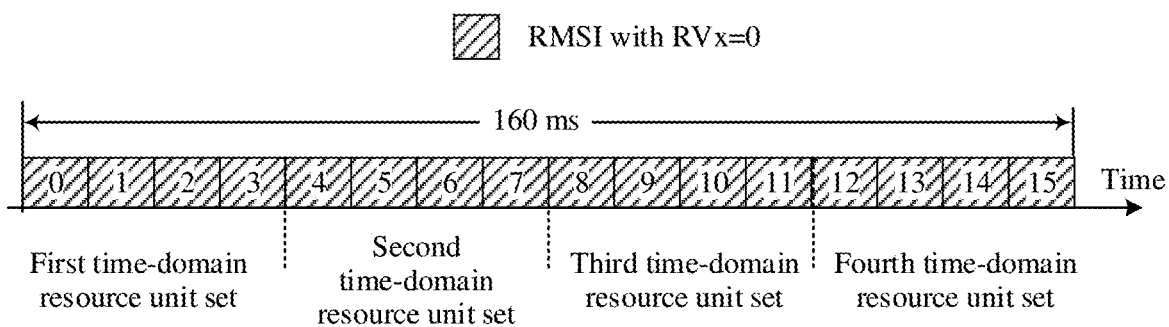
FIG. 11 is a schematic diagram of a third RMSI redundancy version determined by using a system information redundancy version determining method according to an embodiment of this application.

In a possible implementation, the system information may be sent and received in a plurality of time-domain resource unit sets, and a same redundancy version, that is, only one redundancy version, is used for the system information, on time-domain resource units included in the plurality of time-domain resource unit sets. For example, in FIG. 11, the system information is RMSI and the time-domain resource unit is a radio frame. FIG. 11 shows four time-domain resource unit sets. The first time-domain resource unit set includes four radio frames whose identifiers are {x=0, x=1, x=2, x=3}, the second time-domain resource unit set includes four radio frames whose identifiers are {x=4, x=5, x=6, x=7}, the third time-domain resource unit set includes four radio frames whose identifiers are {x=8, x=9, x=10, x=11}, and the fourth time-domain resource unit set includes four radio frames whose identifiers are {x=12, x=13, x=14, x=15}. In this implementation, a redundancy version 0 is used as an example. Redundancy versions of the RMSI in the radio frames in the four time-domain resource unit sets shown in the figures are all the redundancy version 0. It may be understood that another redundancy version, for example, a redundancy version 1 or a redundancy version 2, may alternatively be used for the RMSI in FIG. 11. This is not limited in this embodiment of the present application.

Figure 12:
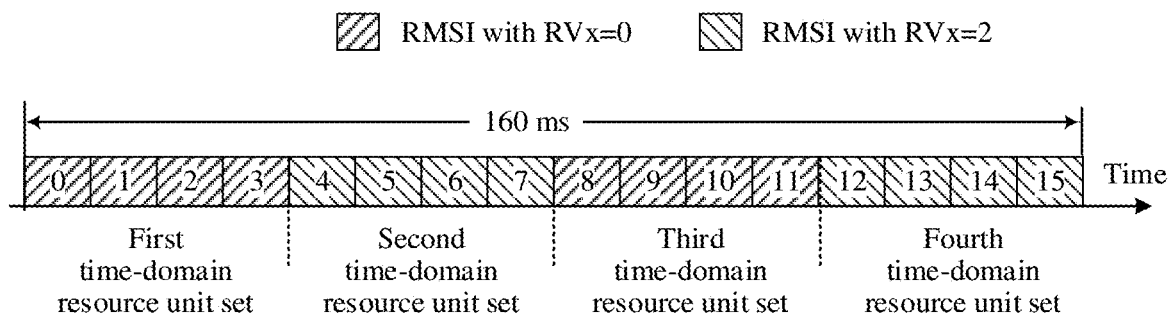
FIG. 12 is a schematic diagram of a fourth RMSI redundancy version determined by using a system information redundancy version determining method according to an embodiment of this application.

In another possible implementation, the system information may be sent and received in a plurality of time-domain resource unit sets, and only two redundancy versions for the system information are used on time-domain resource units included in the plurality of time-domain resource unit sets. For example, in FIG. 12, the system information is RMSI and the time-domain resource unit is a radio frame. FIG. 12 shows four time-domain resource unit sets. The first time-domain resource unit set includes four radio frames whose identifiers are {x=0, x=1, x=2, x=3}, the second time-domain resource unit set includes four radio frames whose identifiers are {x=4, x=5, x=6, x=7}, the third time-domain resource unit set includes four radio frames whose identifiers are {x=8, x=9, x=10, x=11}, and the fourth time-domain resource unit set includes four radio frames whose identifiers are {x=12, x=13, x=14, x=15}. In this implementation, a redundancy version 0 is used for the RMSI on the time-domain resource units included in the first time-domain resource unit set and the third time-domain resource unit set, and a redundancy version 2 is used for the RMSI on the time-domain resource units included in the second time-domain resource unit set and the fourth time-domain resource unit set. It may be understood that another redundancy version or redundancy version sequence, for example, redundancy versions listed below, may be alternatively used for the RMSI in FIG. 12:

redundancy versions 2 and 0, redundancy versions 0 and 1, redundancy versions 1 and 0, redundancy versions 0 and 3, redundancy versions 3 and 0, redundancy versions 1 and 2, redundancy versions 2 and 1, redundancy versions 1 and 3, redundancy versions 3 and 1, redundancy versions 2 and 3, or redundancy versions 3 and 2.

The two redundancy versions may be predefined, or may be configured by a network. Alternatively, the two redundancy versions may be obtained through calculation by using a formula. The formula is similar to that in the descriptions in FIG. 6, FIG. 7A, FIG. 7B, FIG. 8A, FIG. 8B, FIG. 9A, FIG. 9C, and FIG. 9D, only values of some parameters in the formula need to be changed. For example, a parameter related to a predefined quantity of RVs in the formula is set to 2. Details are not described herein again.

Figure 13:
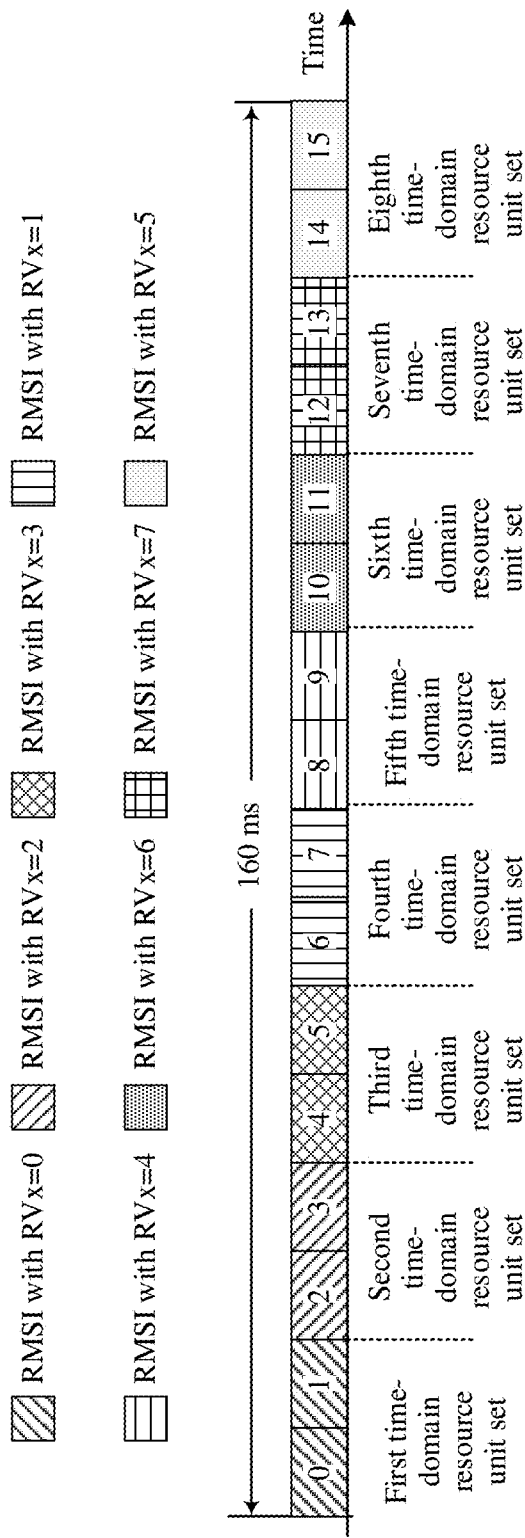
FIG. 13 is a schematic diagram of a fifth RMSI redundancy version determined by using a system information redundancy version determining method according to an embodiment of this application.

In another possible implementation, the system information may be sent and received in a plurality of time-domain resource unit sets, and only eight redundancy versions are used for the system information on time-domain resource units included in the plurality of time-domain resource unit sets. For example, in FIG. 13, the system information is RMSI and the time-domain resource unit is a radio frame. FIG. 13 shows eight time-domain resource unit sets. The first time-domain resource unit set includes two radio frames whose identifiers are {x=0, x=1}, the second time-domain resource unit set includes two radio frames whose identifiers are {x=2, x=3}, the third time-domain resource unit set includes two radio frames whose identifiers are {x=4, x=5}, the fourth time-domain resource unit set includes two radio frames whose identifiers are {x=6, x=7}, the fifth time-domain resource unit set includes two radio frames whose identifiers are {x=8, x=9}, the sixth time-domain resource unit set includes two radio frames whose identifiers are {x=10, x=11}, the seventh time-domain resource unit set includes two radio frames whose identifiers are {x=12, x=13}, and the eighth time-domain resource unit set includes two radio frames whose identifiers are {x=14, x=15}. In this implementation, a redundancy version 0 is used for the RMSI on the time-domain resource unit included in the first time-domain resource unit set, a redundancy version 2 is used for the RMSI on the time-domain resource unit included in the second time-domain resource unit set, a redundancy version 3 is used for the RMSI on the time-domain resource unit included in the third time-domain resource unit set, a redundancy version 1 is used for the RMSI on the time-domain resource unit included in the fourth time-domain resource unit set, a redundancy version 4 is used for the RMSI on the time-domain resource unit included in the fifth time-domain resource unit set, a redundancy version 6 is used for the RMSI on the time-domain resource unit included in the sixth time-domain resource unit set, a redundancy version 7 is used for the RMSI on the time-domain resource unit included in the seventh time-domain resource unit set, and a redundancy version 5 is used for the RMSI on the time-domain resource unit included in the eighth time-domain resource unit set.

It may be understood that another redundancy version or redundancy version sequence, for example, redundancy versions 0, 1, 2, 3, 4, 5, 6, and 7, may alternatively be used for the RMSI in FIG. 13. This is not limited in this embodiment of the present application.

The eight redundancy versions may be predefined, or may be configured by a network. Alternatively, the eight redundancy versions may be obtained through calculation by using a formula. The formula is similar to that in the descriptions in FIG. 6, FIG. 7A, FIG. 7B, FIG. 8A, FIG. 8B, FIG. 9A, FIG. 9C, and FIG. 9D, only values of some parameters in the formula need to be changed. For example, a parameter related to a predefined quantity of RVs in the formula is set to 8. Details are not described herein again.

It should be further understood that in FIG. 7A, FIG. 7B, FIG. 8A, FIG. 8B, FIG. 9A, FIG. 9C, and FIG. 9D, a formula calculation manner is used as an example to obtain the redundancy version on the time-domain resource unit, a manner of obtaining a redundancy version in a specific embodiment of the present application is not limited. In the part 1001, the communications device may alternatively obtain the redundancy version on the time-domain resource unit in another manner.

For example, a correspondence between a time-domain resource unit Ux and a redundancy version RVx is predefined, stored, fixed, or preconfigured. The communications device obtains the redundancy version RVx for the system information on the time-domain resource unit Ux according to the correspondence between a time-domain resource unit Ux and a redundancy version RVx. In a possible implementation, using FIG. 8A as an example, Table 1 may provide an example of the correspondence between a time-domain resource unit Ux and a redundancy version RVx.

TABLE 1

Redundancy version RVx for system information on a time-domain resource unit Ux

| Time-domain resource unit Ux | Redundancy version RVx |
|---|---|
| 0 | 0 |
| 1 | 0 |
| 2 | 0 |
| 3 | 0 |
| 4 | 2 |
| 5 | 2 |

TABLE 1-continued

Redundancy version RVx for system information
on a time-domain resource unit Ux

| Time-domain resource unit Ux | Redundancy version RVx |
| --- | --- |
| 6 | 2 |
| 7 | 2 |
| 8 | 3 |
| 9 | 3 |
| 10 | 3 |
| 11 | 3 |
| 12 | 1 |
| 13 | 1 |
| 14 | 1 |
| 15 | 1 |

In another possible implementation, a correspondence between a time-domain resource unit set and a redundancy version RVx is predefined, stored, fixed, or preconfigured, and the communications device learns of a time-domain resource unit set to which the time-domain resource unit Ux belongs, so that the communications device can learn of, according to the correspondence, the redundancy version RVx for the system information on the time-domain resource unit Ux. Using FIG. 12 as an example, Table 2 shows an example of the correspondence between a time-domain resource unit set and a redundancy version RVx.

TABLE 2

Redundancy version RVx for system information
on a time-domain resource unit set

| Time-domain resource unit set | Redundancy version RVx |
| --- | --- |
| First time-domain resource unit set | 0 |
| Second time-domain resource unit set | 2 |
| Third time-domain resource unit set | 0 |
| Fourth time-domain resource unit set | 2 |

For another example, the network device may configure the redundancy version RVx on the time-domain resource unit Ux for the terminal device. The network device may notify the terminal device of the correspondence between a time-domain resource unit Ux and a redundancy version RVx, or the correspondence between a time-domain resource unit set and a redundancy version RVx by using downlink control information or higher layer signaling. The terminal device may determine the redundancy version RVx for the system information on the time-domain resource unit Ux according to the correspondence.

It may be understood that redundancy versions RVx for system information on the time-domain resource unit Ux in different multiplexing manners of the system information and the synchronization signal block may be obtained by using different methods (for example, through predefinition, configuration, and indication). The different multiplexing manners of the system information and the synchronization signal block include time division multiplexing and frequency division multiplexing. For example, the system information is RMSI, and a multiplexing manner of the RMSI and the synchronization signal block includes time division multiplexing and frequency division multiplexing. In an example, when the RMSI and the synchronization signal block are time division multiplexed, a redundancy version RVx used for transmission of the RMSI on the time-domain resource unit Ux may be obtained according to the method described in FIG. 4 and FIG. 6; or when the RMSI and the synchronization signal block are frequency division multiplexed, a redundancy version RVx used for transmission of the RMSI on the time-domain resource unit Ux may be configured or indicated by using DCI. In another example, when the RMSI and the synchronization signal block are time division multiplexed, a redundancy version RVx used for transmission of the RMSI on the time-domain resource unit Ux may be configured or indicated by using DCI; or when the RMSI and the synchronization signal block are frequency division multiplexed, a redundancy version RVx used for transmission of the RMSI on the time-domain resource unit Ux may be obtained according to the method described in FIG. 4 and FIG. 6. It should be noted that when the RVx is configured or indicated by using the DCI, some fields in the DCI may be reused, for example, at least one of the following fields is reused: {a field Redundancy version, a field HARQ process number, a field TPC command for PUCCH, a field ARI (ACK/NAK Resource Index), a field Frequency domain resource assignment, a field ARI HARQ timing indicator, a field Carrier indicator, a field BWP indicator, a field Time-domain PDSCH resources, a field VRB-to-PRB mapping, a field Reserved resource set on/off, a field Bundling size indicator, a field Modulation and coding scheme, second CW, a field New data indicator, second CW, a field Redundancy version, second CW, a field CBGFI, a field CBGTI, a field Downlink Assignment Index, a field Antenna port(s), and a field TCI (Transmission Configuration Indication)}. It may be understood that the network device may use both the method described in FIG. 4 and FIG. 6 and the method for configuring an RVx in DCI. When an RVx in DCI for system information received by the terminal device is different from an RVx obtained by using the method described in FIG. 4 and FIG. 6, the RVx indicated in the DCI may be used as a criterion, or the RVx obtained by using the method described in FIG. 4 and FIG. 6 may be used as a criterion. Alternatively, the network device may use the method described in FIG. 4 and FIG. 6 as a default method. If the RVx is configured in the DCI, the terminal device uses the RVx configured in the DCI as a criterion. Alternatively, the network device may add the RVx to the DCI, configure the RVx by using the DCI, or obtain the RVx by using the method described in FIG. 4 and FIG. 6, and may reuse any field above for indication.

In the part 1002, the communications device may use the redundancy version according to the methods shown and described in FIG. 7B, FIG. 8B, FIG. 9A, and FIG. 9C, the system information is received or sent on at least one of the at least two time-domain resource units that are consecutive in time domain. For detailed content, refer to descriptions corresponding to FIG. 7B, FIG. 8B, FIG. 9A, and FIG. 9C, and details are not described herein again.

According to the system information redundancy version determining method and apparatus provided in the embodiments of this application, the quantity of time-domain resource units that can carry the valid RV for the system information is increased, to resolve a problem that a quantity of beams that carry the system information is reduced because beams on some time-domain resource units cannot support the valid RV for the system information, thereby increasing coverage of the system information. In addition, in some implementations, an RV for sending and receiving the system information on one beam can be added in a system information window or a system information subwindow, thereby providing a larger frequency selective gain for receiving the system information.

It may be understood that the methods implemented by the communications device in the foregoing method embodiments may alternatively be implemented by a component (for example, an integrated circuit or a chip) that can be used in the communications device.

In correspondence to the wireless communication method provided in the foregoing method embodiments, an embodiment of this application further provides a corresponding communications apparatus (sometimes referred to as a communications device). The communications apparatus includes a corresponding module configured to perform each part in the foregoing embodiment. The module may be software, hardware, or a combination of software and hardware.

Figure 14:
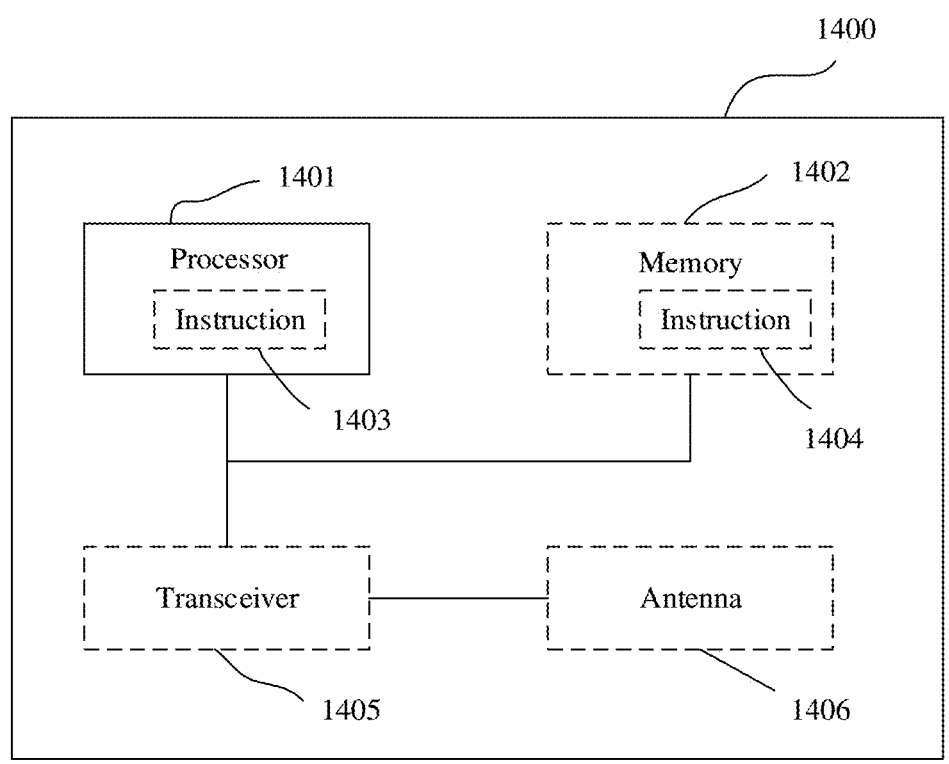
FIG. 14 is a schematic structural diagram of a communications apparatus according to an embodiment of this application.

FIG. 14 is a schematic structural diagram of a communications apparatus. The communications apparatus 1400 may be the network device 10 or 20 in FIG. 2, or may be the terminal device 11, 12, 21, or 22 in FIG. 2. The communications apparatus may be configured to implement the method that corresponds to the communications device and that is described in the foregoing method embodiments. For details, refer to the descriptions in the foregoing method embodiments.

The communications apparatus 1400 may include one or more processors 1401. The processor 1401 may also be referred to as a processing unit, and may implement a control function. The processor 1401 may be a general-purpose processor, a dedicated processor, or the like, for example, may be a baseband processor or a central processing unit. The baseband processor may be configured to process a communication protocol and communication data. The central processing unit may be configured to control the communications apparatus (for example, a base station, a baseband chip, a distributed unit (DU), or a centralized unit (CU)), execute a software program, and process data of the software program.

In a possible design, the processor 1401 may alternatively store an instruction 1403, and the instruction may be run by the processor, so that the communications apparatus 1400 performs the method that corresponds to the communications device and that is described in the foregoing method embodiments.

In another possible design, the communications apparatus 1400 may include a circuit, and the circuit may implement the transmission, reception, or communication function in the foregoing method embodiments.

Optionally, the communications apparatus 1400 may include one or more memories 1402. The memory stores an instruction 1404, and the instruction may be run on the processor, so that the communications apparatus 1400 performs the method described in the foregoing embodiments. Optionally, the memory may further store data. Optionally, the processor may further store an instruction and/or data. The processor and the memory may be disposed separately, or may be integrated together.

Optionally, the communications apparatus 1400 may further include a transceiver 1405 and/or an antenna 1406. The processor 1401 may be referred to as a processing unit, and controls the communications apparatus (a terminal device or a network device). The transceiver 1405 may be referred to as a transceiver unit, a transceiver machine, a transceiver circuit, a transceiver, or the like, and is configured to implement transmission and reception functions of the communications apparatus.

In a design, the communications apparatus 1400 (for example, an integrated circuit, a wireless device, a circuit module, a network device, or a terminal device) may include the processor 1401. The processor 1401 determines at least one time-domain resource unit Ux, where x is an identifier of the time-domain resource unit, and the processor 1401 determines a redundancy version RVx for system information on the time-domain resource unit Ux according to the time-domain resource unit Ux, where the redundancy version RVx satisfies RVx=(Int1(X1/X2*(Int2(x/M) mod K))) mod L, x is a non-negative integer, X1 and X2 are non-zero real numbers, M is a positive real number, K and L are positive integers, mod indicates a modulo operation, Int1 indicates rounding up or rounding down, and Int1 indicates rounding up or rounding down. Alternatively, the processor 1401 determines at least one time-domain resource unit Ux, and the processor 1401 determines the time-domain resource unit Ux according to a quantity N of synchronization signal blocks, where the time-domain resource unit Ux includes at least one time-domain resource unit that is of a PDCCH and/or a PDSCH and that is used to receive or send the system information. Optionally, the processor may be further configured to support the communications apparatus 1400 in receiving or sending the system information according to the determined redundancy version RVx.

The processor and the transceiver described in this application may be implemented on an integrated circuit (IC), an analog IC, a radio frequency integrated circuit RFIC, a composite signal IC, an application-specific integrated circuit (ASIC), a printed circuit board 0(PCB), an electronic device, or the like. The processor and the transceiver may alternatively be manufactured by using various IC technologies, for example, a complementary metal oxide semiconductor (CMOS), an n-channel metal-oxide-semiconductor (NMOS), a p-channel metal-oxide-semiconductor (PMOS), a bipolar junction transistor (BJT), a bipolar CMOS (BiCMOS), silicon germanium (SiGe), and gallium arsenide (GaAs).

In the descriptions of the foregoing embodiments, the communications apparatus is described by using the network device or the terminal device as an example. However, a scope of the communications apparatus described in this application is not limited to the example, and the structure of the communications apparatus may not be limited by FIG. 14. The communications apparatus may be an independent device or may be a part of a relatively large device. For example, the device may be:

(1) an independent integrated circuit (IC), a chip, a chip system, or a subsystem;

(2) a set including one or more ICs, where optionally, the IC set may further include a storage component configured to store data and/or an instruction;

(3) an ASIC, for example, a modem (MSM);

(4) a module that can be built in another device;

(5) a receiver, a terminal, an intelligent terminal, a cellular phone, a wireless device, a handheld device, a mobile unit, a vehicle-mounted device, a network device, a cloud device, an artificial intelligence device, or the like; and (6) others.

Figure 15:
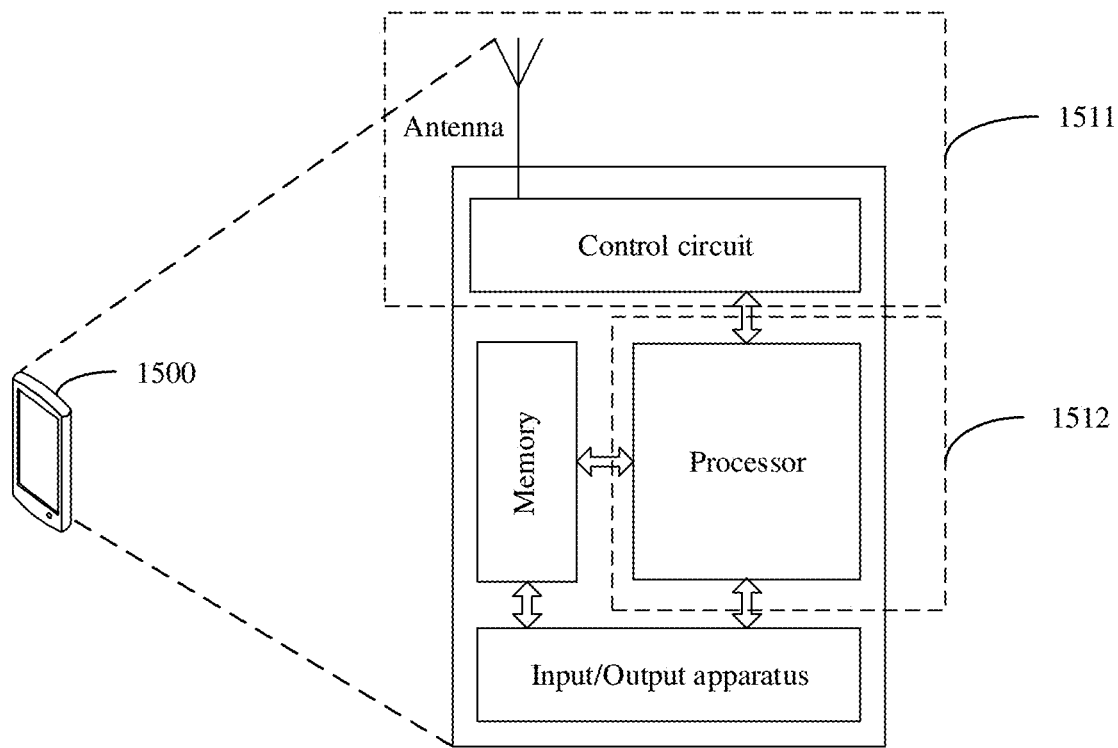
FIG. 15 is a schematic structural diagram of a terminal device according to an embodiment of this application.

FIG. 15 is a schematic structural diagram of a terminal device. The terminal device is applicable to the system shown in FIG. 2. For ease of description, FIG. 15 shows only main components of the terminal device. As shown in FIG. 15, the terminal 1500 includes a processor, a memory, a control circuit, an antenna, and an input/output apparatus. The processor is mainly configured to: process a communication protocol and communication data, control the entire terminal, execute a software program, and process data of the software program. The memory is mainly configured to store a software program and data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to: receive data input by a user and output data to the user.

After user equipment is turned on, the processor may read a software program stored in a storage unit, explain and execute an instruction of the software program, and process data of the software program. When data needs to be sent in a wireless manner, the processor performs baseband processing on the to-be-sent data, and outputs a baseband signal to the radio frequency circuit. After performing radio frequency processing on the baseband signal, the radio frequency circuit sends the radio frequency signal to the outside by using the antenna in a form of an electromagnetic wave. When data is sent to the user equipment, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that for ease of description, FIG. 15 shows only one memory and only one processor. In an actual terminal device, there may be a plurality of processors and a plurality of memories. The memory may also be referred to as a storage medium, a storage device, or the like. This is not limited in this embodiment of the present application.

In an optional implementation, the processor may include a baseband processor and a central processing unit. The baseband processor is mainly configured to process a communication protocol and communication data. The central processing unit is mainly configured to: control the entire terminal device, execute a software program, and process data of the software program. The processor in FIG. 15 integrates functions of the baseband processor and the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. The function of processing the communication protocol and the communication data may be embedded in the processor, or may be stored in the memory in a form of software program. The processor executes the software program to implement a baseband processing function.

In an example, the antenna and the control circuit that have transmission and reception functions may be considered as a transceiver unit 1511 of the terminal 1500, and the processor having a processing function may be considered as a processing unit 1512 of the terminal 1500. As shown in FIG. 15, the terminal device 1500 includes the transceiver unit 1511 and the processing unit 1512. The transceiver unit may also be referred to as a transceiver, a transceiver machine, a transceiver apparatus, or the like. Optionally, a component that is in the transceiver unit 1511 and that is configured to implement a reception function may be considered as a receiving unit, and a component that is in the transceiver unit 1511 and that is configured to implement a transmission function may be considered as a sending unit. That is, the transceiver unit 1511 includes the receiving unit and the sending unit. For example, the receiving unit may also be referred to as a receiver machine, a receiver, a receiver circuit, or the like, and the sending unit may be referred to as a transmitter machine, a transmitter, a transmit circuit, or the like.

Figure 16:
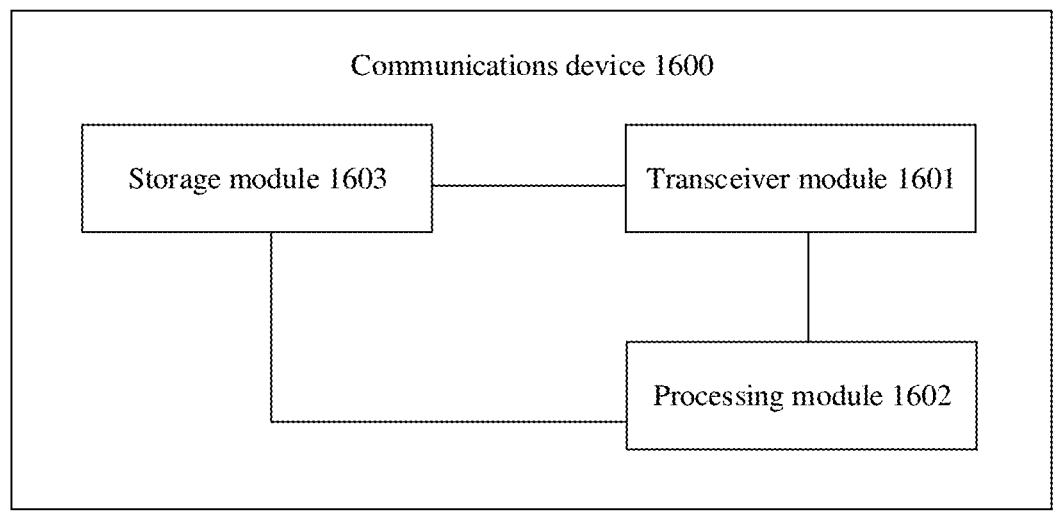
FIG. 16 is a schematic diagram of a communications device according to an embodiment of this application.

As shown in FIG. 16, another embodiment of this application provides a communications apparatus (a communications device) 1600. The communications apparatus may be a terminal device, or may be a component (for example, an integrated circuit or a chip) of a terminal device. The communications apparatus may alternatively be a network device, or may be a component (for example, an integrated circuit or a chip) of a network device. Alternatively, the communications apparatus may be another communications module, configured to implement an operation corresponding to the communications device in the method embodiments of this application. The communications apparatus 1600 may include a processing module 1602. Optionally, the communications apparatus 1600 may further include a transceiver module 1601 and a storage module 1603.

The processing module 1602 is configured to determine at least one time-domain resource unit Ux, where x is an identifier of the time-domain resource unit. The processing module 1602 determines a redundancy version RVx for system information on the time-domain resource unit Ux according to the time-domain resource unit Ux, where the redundancy version RVx satisfies RVx=(Int1(X1/X2*(Int2 (x/M) mod K))) mod L, x is a non-negative integer, X1 and X2 are non-zero real numbers, M is a positive real number, K and L are positive integers, mod indicates a modulo operation, Int1 indicates rounding up or rounding down, and Int1 indicates rounding up or rounding down.

Optionally, M is a predefined positive real number. Preferably, M is one of {1, 2, 4, 5, 8, 16}.

Optionally, M is a quantity of time-domain resource units included in a system information subwindow.

Optionally, the processing module 1602 determines M according to a system information transmission periodicity.

Optionally, different system information transmission periodicities correspond to a same value of M.

Optionally, M or the system information transmission periodicity is indicated by an existing field in DCI; or M or the system information transmission periodicity is configured by using higher layer signaling, and the higher layer signaling is at least one of RRC signaling, system information, or a MAC-CE; or M or the system information transmission periodicity is configured (indicated) by using DCI and higher layer signaling, and the higher layer signaling is at least one of RRC signaling, system information, or a MAC-CE; and the DCI and/or higher layer signaling are/is received or sent by the transceiver module 1601.

Optionally, M or the system information transmission periodicity in different multiplexing manners of the system information and a synchronization signal block is separately defined or configured (indicated). The different multiplexing manners of the system information and the synchronization signal block include time division multiplexing and frequency division multiplexing.

Optionally, the processing module 1602 determines M according to at least one of {a quantity N of synchronization signal blocks, a quantity D of time-domain resource units included in a system information subwindow}.

Optionally, M=N*D, M=n*N*D, M=N*D+F, or M=n*N*D+F. D represents a quantity of time-domain resource units included in one system information subwindow; n represents a positive integer, and may be understood as a multiple of a beam sweeping periodicity in some implementations; and F represents a non-negative integer, and may be obtained through configuration or predefinition in some implementations.

Optionally, a beam that carries the system information in the system information subwindow is one of beams that carry the N synchronization signal blocks.

Optionally, the processing module 1602 determines the time-domain resource unit Ux according to the quantity N of synchronization signal blocks, where the time-domain resource unit Ux includes at least one time-domain resource unit that is of a PDCCH and/or a PDSCH and that is used to receive or send the system information.

Optionally, the time-domain resource unit Ux is fixed or predefined, or the time-domain resource unit Ux is configured or indicated by using signaling received or sent by the transceiver module 1601, and the time-domain resource unit Ux includes at least one time-domain resource unit that is of a PDCCH and/or a PDSCH and that is used to receive or send the system information.

Optionally, the time-domain resource unit Ux includes a start time-domain resource unit that is of the PDCCH and/or the PDSCH and that is used to receive or send the system information.

Optionally, the processing module 1602 determines at least two time-domain resource units that are consecutive in time domain and that can be used to receive or send the system information. The processing module 1602 determines redundancy versions for the system information on the at least two time-domain resource units, where the redundancy versions for the system information on the at least two time-domain resource units are the same.

Optionally, the at least two time-domain resource units are time-domain resource units that can carry the system information.

Optionally, the at least two time-domain resource units belong to one time-domain resource unit set, and the time-domain resource unit set includes one or more radio frames, one or more subframes, one or more slots, one or more mini-slots, one or more symbols, one or more system information occasions, one or more system information windows, one or more system information subwindows, or one or more beam sweeping periodicities.

Optionally, the system information includes RMSI, OSI, or RMSI and OSI.

Optionally, the time-domain resource unit may be one of a symbol, a mini-slot, a slot, a subframe, a radio frame, or a sampling point.

In this embodiment provided in this application, the storage module 1603 is configured to store at least one of a parameter, information, and an instruction.

In a possible design, one or more modules in FIG. 16 may be implemented by one or more processors, or may be implemented by one or more processors and one or more memories, or may be implemented by one or more processors and one or more transceivers, or may be implemented by one or more processors, one or more memories, and one or more transceivers. This is not limited in this embodiment of this application. The processor, the memory, and the transceiver may be separately disposed, or may be integrated together.

It should be noted that, for operations and implementations of the modules in the communications apparatus 1600 in this embodiment of this application, further refer to corresponding descriptions in the foregoing corresponding method embodiments.

A person skilled in the art may further understand that various illustrative logical blocks (illustrative logical block) and steps (step) that are listed in the embodiments of this application may be implemented by using electronic hardware, computer software, or a combination thereof. Whether the functions are implemented by using hardware or software depends on a particular application and a design requirement of an entire system. A person skilled in the art may use various methods to implement the described functions for each particular application, but it should not be considered that the implementation goes beyond the scope of the embodiments of this application.

The technologies described in this application may be implemented in various manners. For example, these technologies may be implemented by using hardware, software, or a combination of hardware and software. For hardware implementation, a processing unit configured to perform these technologies at a communications apparatus (for example, a base station, a terminal, a network entity, or a chip) may be implemented in one or more general-purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general-purpose processor may be a microprocessor. Optionally, the general-purpose processor may also be any traditional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

A person of ordinary skill in the art may understand that various reference numerals such as "first" and "second" in this application are merely used for differentiation for ease of description, and are not used to limit a scope of the embodiments of this application, or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof means any combination of these items, including any combination of a single item (quantity) or a plurality of items (quantity). For example, at least one (one piece) of a, b, or c may represent: a, b, c, a-b, a-c, b-c, or a-b-c, where a, b, and c may be singular or plural.

Steps of the methods or algorithms described in the embodiments of this application may be directly embedded in hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to the processor, so that the processor may read information from the memory and write information to the memory. Alternatively, the memory may alternatively be integrated into the processor. The processor and the memory may be disposed in an ASIC, and the ASIC may be disposed in a terminal. Optionally, the processor and the memory may alternatively be disposed in different components of the terminal.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like. The foregoing combination should also be included in the protection scope of the computer-readable medium.

For same or similar parts in the embodiments of this specification, refer to each other. The foregoing implementations of this application are not intended to limit the protection scope of this application.

What is claimed is:

1. An apparatus, comprising:
   at least one processor; and
   a non-transitory memory coupled to the at least one processor, wherein the non-transitory stores computer-readable instructions that are executable by the at least one processor, the instructions comprising instructions for:
   obtaining, according to a quantity of actually transmitted synchronization signal blocks, at least one time-domain resource unit in at least one physical downlink control channel (PDCCH) occasion, the at least one PDCCH occasion being associated with an actually transmitted synchronization signal block of the actually transmitted synchronization signal blocks, wherein the at least one PDCCH occasion is comprised in a system information window, the system information window comprises one or more PDCCH occasions including the at least one PDCCH occasion, and each PDCCH occasion of the one or more PDCCH occasions is associated with an actually transmitted synchronization signal block of the actually transmitted synchronization signal blocks; and
   receiving a PDCCH on the at least one time-domain resource unit, the PDCCH carrying control information corresponding to system information.

2. The apparatus according to claim 1, wherein a time length of the system information window is 8oms, 16oms, 32oms or 64oms.

3. The apparatus according to claim 1, wherein the instructions for obtaining, according to the quantity of the actually transmitted synchronization signal blocks, the at least one time-domain resource unit in the at least one PDCCH occasion, comprise instructions for:
   obtaining, according to the quantity of the actually transmitted synchronization signal blocks and indexes of the actually transmitted synchronization signal blocks, the at least one time-domain resource unit in the at least one PDCCH occasion.

4. The apparatus according to claim 1, wherein PDCCH occasions of the at least one PDCCH occasion are discretely distributed in time domain.

5. The apparatus according to claim 1, wherein the actually transmitted synchronization signal blocks are a part or all of candidate synchronization signal blocks.

6. The apparatus according to claim 1, wherein each of the actually transmitted synchronization signal blocks comprises a primary synchronization signal (PSS), a secondary synchronization signal (SSS) and a physical broadcast channel (PBCH).

7. A method, comprising:
   obtaining, according to a quantity of actually transmitted synchronization signal blocks, at least one time-domain resource unit in at least one physical downlink control channel (PDCCH) occasion, the at least one PDCCH occasion being associated with an actually transmitted synchronization signal block of the actually transmitted synchronization signal blocks, wherein the at least one PDCCH occasion is comprised in a system information window, the system information window comprises one or more PDCCH occasions including the at least one PDCCH occasion, and each PDCCH occasion of the one or more PDCCH occasions is associated with an actually transmitted synchronization signal block of the actually transmitted synchronization signal blocks; and
   receiving a PDCCH on the at least one time-domain resource unit, the PDCCH carrying control information corresponding to system information.

8. The method according to claim 7, wherein a time length of the system information window is 8oms, 16oms, 32oms or 64oms.

9. The method according to claim 7, wherein obtaining, according to the quantity of the actually transmitted synchronization signal blocks, the at least one time-domain resource unit in the at least one PDCCH occasion, comprises:
   obtaining, according to the quantity of the actually transmitted synchronization signal blocks and indexes of the actually transmitted synchronization signal blocks, the at least one time-domain resource unit in the at least one PDCCH occasion.

10. The method according to claim 7, wherein PDCCH occasions of the at least one PDCCH occasion are discretely distributed in time domain.

11. The method according to claim 7, wherein the actually transmitted synchronization signal blocks are a part or all of candidate synchronization signal blocks.

12. The method according to claim 7, wherein each of the actually transmitted synchronization signal blocks comprises a primary synchronization signal (PSS), a secondary synchronization signal (SSS) and a physical broadcast channel (PBCH).

13. A non-transitory computer readable medium storing a program that is executable by a computing device to cause the computing device to:
  obtain, according to a quantity of actually transmitted synchronization signal blocks, at least one time-domain resource unit in at least one physical downlink control channel (PDCCH) occasion, the at least one PDCCH occasion being associated with an actually transmitted synchronization signal block of the actually transmitted synchronization signal blocks, wherein the at least one PDCCH occasion is comprised in a system information window, the system information window comprises one or more PDCCH occasions including the at least one PDCCH occasion, and each PDCCH occasion of the one or more PDCCH occasions is associated with an actually transmitted synchronization signal block of the actually transmitted synchronization signal blocks; and
  receive a PDCCH on the at least one time-domain resource unit, the PDCCH carrying control information corresponding to system information.

14. The non-transitory computer readable medium according to claim 13, wherein a time length of the system information window is 8oms, 16oms, 32oms or 64oms.

15. The non-transitory computer readable medium according to claim 13, wherein the computing device being caused to obtain, according to the quantity of the actually transmitted synchronization signal blocks, the at least one time-domain resource unit in the at least one PDCCH occasion, comprises the computing device being caused to:
  obtain, according to the quantity of the actually transmitted synchronization signal blocks and indexes of the actually transmitted synchronization signal blocks, the at least one time-domain resource unit in the at least one PDCCH occasion.

16. The non-transitory computer readable medium according to claim 13, wherein PDCCH occasions of the at least one PDCCH occasion are discretely distributed in time domain.

17. The non-transitory computer readable medium according to claim 13, wherein the actually transmitted synchronization signal blocks are a part or all of candidate synchronization signal blocks.

18. The non-transitory computer readable medium according to claim 13, wherein each of the actually transmitted synchronization signal blocks comprises a primary synchronization signal (PSS), a secondary synchronization signal (SSS) and a physical broadcast channel (PBCH).

* * * * *

UNITED STATES PATENT AND TRADEMARK OFFICE
CERTIFICATE OF CORRECTION

PATENT NO. : 11,489,645 B2
APPLICATION NO. : 17/036214
DATED : November 1, 2022
INVENTOR(S) : Kuandong Gao It is certified that error appears in the above-identified patent and that said Letters Patent is hereby corrected as shown below:

In the Specification

In the Summary, Column 2, Line 36; delete "Int1" and insert --Int2--.

In the Summary, Column 4, Line 65; delete "Int1" and insert --Int2--.

In the Detailed Description of Illustrative Embodiments, Column 15, Line 37; delete "RVx=*Int1(X1/X2*(Int2(x/M) mod K)))" and insert --RVx=Int1(X1/X2*(Int2(x/M) mod K))--.

In the Detailed Description of Illustrative Embodiments, Column 15, Line 43; delete "Int1" and insert --Int2--.

In the Detailed Description of Illustrative Embodiments, Column 16, Line 4; delete "x=1.5" and insert --"x=15"--.

In the Detailed Description of Illustrative Embodiments, Column 17, Line 10; delete "pall" and insert --part--.

In the Detailed Description of Illustrative Embodiments, Column 17, Line 53; delete "is$_4$" and insert --is 4--.

In the Detailed Description of Illustrative Embodiments, Column 18, Line 61; delete "x=$_4$" and insert --x=4--.

In the Detailed Description of Illustrative Embodiments, Column 18, Line 65; delete "x=$_4$" and insert --x=4--.

In the Detailed Description of Illustrative Embodiments, Column 19, Line 44; delete "x= $_4$" and insert --x=4--.

Signed and Sealed this
Twentieth Day of December, 2022

Katherine Kelly Vidal
*Director of the United States Patent and Trademark Office*

CERTIFICATE OF CORRECTION (continued)
U.S. Pat. No. 11,489,645 B2

In the Detailed Description of Illustrative Embodiments, Column 20, Line 3; delete "x1=x/M=x/i" and insert --x1=x/M=x/1--.

In the Detailed Description of Illustrative Embodiments, Column 24, Line 23; delete "RVx=i" and insert --RVx=1--.

In the Detailed Description of Illustrative Embodiments, Column 25, Line 48; delete "xyo. The start time-domain resource unit xyo may be" and insert --xy0. The start time-domain resource unit xy0 may be--.

In the Detailed Description of Illustrative Embodiments, Column 26, Line 43; delete "xyo" and insert --xy0--.

In the Detailed Description of Illustrative Embodiments, Column 27, Line 32; delete "xyo" and insert --xy0--.

In the Detailed Description of Illustrative Embodiments, Column 27, Line 34; delete "xyo" and insert --xy0--.

In the Detailed Description of Illustrative Embodiments, Column 27, Line 39; delete "xyo" and insert --xy0--.

In the Detailed Description of Illustrative Embodiments, Column 27, Line 54; delete "xyo+f(j, D)) mod N_frame, (xyo+f(j, D+Oj) mod" and insert --(xy0+f(j, D)) mod N_frame, (xy0+f(j, D)+Oj) mod--.

In the Detailed Description of Illustrative Embodiments, Column 28, Line 8; delete "xyo" and insert --xy0--.

In the Detailed Description of Illustrative Embodiments, Column 28, Line 12; delete "xyo" and insert --xy0--.

In the Detailed Description of Illustrative Embodiments, Column 28, Line 13; delete "xyo" and insert --xy0--.

In the Detailed Description of Illustrative Embodiments, Column 28, Line 18; delete "xyo" and insert --xy0--.

In the Detailed Description of Illustrative Embodiments, Column 31, Line 19; delete "2'7" and insert --27--.

In the Detailed Description of Illustrative Embodiments, Column 38, Line 9; delete "Int1" and insert --Int2--.

In the Detailed Description of Illustrative Embodiments, Column 38, Line 25; delete "0" before "(PCB)".

CERTIFICATE OF CORRECTION (continued)
U.S. Pat. No. 11,489,645 B2

In the Detailed Description of Illustrative Embodiments, Column 40, Line 36; delete "Int1" and insert --Int2--.